(12) United States Patent
Taguchi et al.

(10) Patent No.: US 12,537,443 B2
(45) Date of Patent: Jan. 27, 2026

(54) CHARGER WITH DEAD TIME CONTROL

(71) Applicant: Yazaki Corporation, Tokyo (JP)

(72) Inventors: Noritaka Taguchi, Susono (JP); Ryo Gondo, Susono (JP); Daisuke Maezaki, Susono (JP); Yoshiya Ohnuma, Nagaoka (JP); Shunsuke Takuma, Nagaoka (JP); Shohei Komeda, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 252 days.

(21) Appl. No.: 18/351,066

(22) Filed: Jul. 12, 2023

(65) Prior Publication Data

US 2024/0072666 A1    Feb. 29, 2024

(30) Foreign Application Priority Data

Aug. 17, 2022 (JP) ................................ 2022-130165

(51) Int. Cl.
*H02M 1/42* (2007.01)
*H02J 7/02* (2016.01)
*H02M 1/38* (2007.01)
*H02M 3/158* (2006.01)
*H02M 3/335* (2006.01)

(52) U.S. Cl.
CPC ............ *H02M 1/4225* (2013.01); *H02J 7/02* (2013.01); *H02M 1/385* (2021.05); *H02M 3/158* (2013.01); *H02M 3/33573* (2021.05); *H02M 3/33576* (2013.01)

(58) Field of Classification Search
CPC ............................ H02J 7/02; H02M 3/33584
See application file for complete search history.

(56) References Cited

U.S. PATENT DOCUMENTS

2020/0021198 A1*  1/2020  Miyazaki .......... H02M 3/33576
2022/0060045 A1*  2/2022  Imoto ............... H02M 3/33573

OTHER PUBLICATIONS

Shohei Komeda, et al., "A Dual Active Bridge AC-DC Converter with an Active Energy Buffer", Papers of Technical Meeting on Semiconductor Power Converter, 2021, SPC-21-003, pp. 13-18.

* cited by examiner

*Primary Examiner* — Thienvu V Tran
*Assistant Examiner* — Jennifer C Caulk
(74) *Attorney, Agent, or Firm* — Sughrue Mion, PLLC

(57) ABSTRACT

The control of the switches S21 to S28 of the DC/DC converter 120 includes a first mode in which all of the switches S21 to S28 of the DC/DC converter 120 are OFF and a plurality of second modes in which at least one of the switches S21 to S28 of the DC/DC converter 120 is ON, and when switching from the first mode to one of the plurality of second modes, a dead time $T_d$ is not provided between the first mode and the one of the plurality of second modes.

8 Claims, 17 Drawing Sheets

FIG. 3

| | SWITCH S21 | SWITCH S22 | SWITCH S23 | SWITCH S24 | SWITCH S25 | SWITCH S26 | SWITCH S27 | SWITCH S28 | SWITCH S31 |
|---|---|---|---|---|---|---|---|---|---|
| MODE 1 | on | off | off | on | off | on | on | off | on |
| MODE 2 | on | off | off | on | on | off | off | on | on |
| MODE 3 | on | off | off | on | on | off | off | on | off |
| MODE 4 | off | on | on | off | on | off | off | on | on |
| MODE 5 | off | off | off | off | off | on | off | off | off |
| MODE 6 | off | on | on | off | off | on | on | off | off |
| MODE 7 | off | on | on | off | off | on | on | off | on |

PHASE OF ALTERNATING-CURRENT POWER SUPPLY VOLTAGE ωst (deg)

PRIOR ART

FIG. 7

|  | SWITCH S21 | SWITCH S22 | SWITCH S23 | SWITCH S24 | SWITCH S25 | SWITCH S26 | SWITCH S27 | SWITCH S28 | SWITCH S31 |
|---|---|---|---|---|---|---|---|---|---|
| MODE 1 | on | off | off | on | off | on | on | off | on |
| MODE 2 | on | off | off | on | on | off | off | on | on |
| MODE 3 | on | off | off | on | on | off | off | on | off |
| MODE 4 | off | on | on | off | on | off | off | on | on |
| MODE 5 | off | off | off | off | off | off | on | off | off |
| MODE 6 | off | on | on | off | off | on | on | off | off |
| MODE 7 | off | on | on | off | off | on | on | off | on |
| MODE 8 | on | off | off | off | off | on | on | off | off |
| MODE 9 | off | on | on | off | on | off | off | on | off |

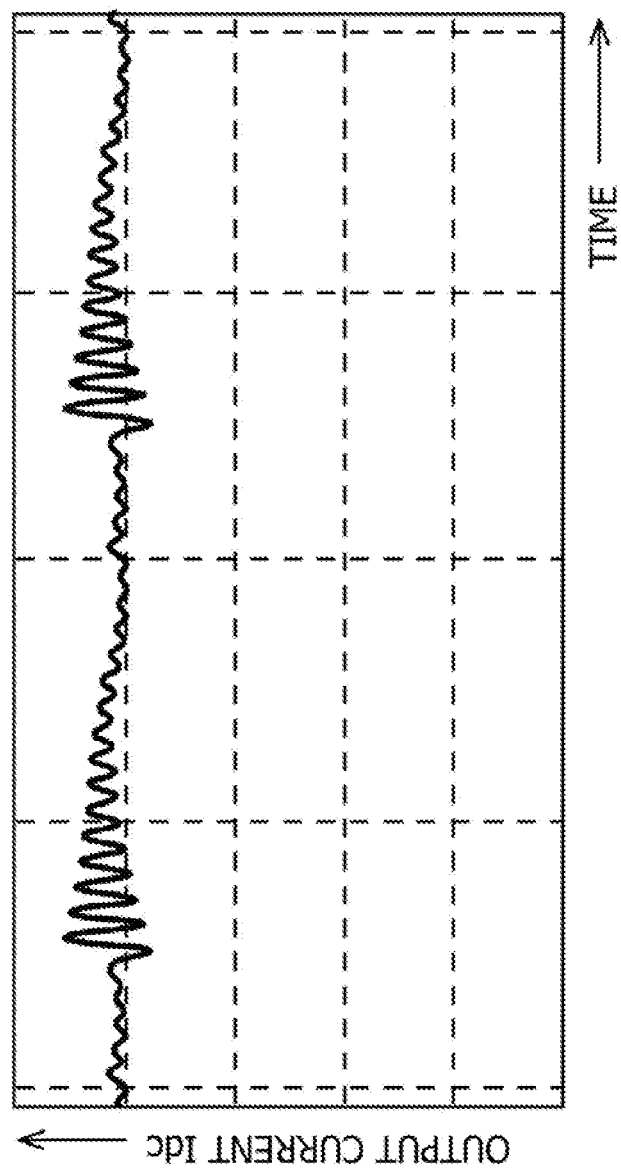

CHARGER WITH DEAD TIME CONTROL

TECHNICAL FIELD

The present invention relates to a charger.

BACKGROUND

Various insulated single-phase AC/DC converters have been studied as battery chargers for electric vehicles. In general, a circuit configuration including a diode rectifier with a power factor correction (PFC) circuit, a large-capacity capacitor in the DC link section, and a high-frequency isolated DC/DC converter is used as a charger for electric vehicles. The large-capacity capacitor in the DC link section is required to have a capacity sufficient to absorb power ripple from the single-phase AC power supply, and with such a circuit configuration, it has been difficult to reduce the size.

As a compact charger capable of absorbing the ripple of the power, Non-Patent Document 1 discloses a charging circuit including a Dual-Active-Bridge (DAB) converter with an active buffer for absorbing the ripple of the power and also discloses control thereof.

RELATED ART

Non-Patent Document

Non-Patent Document 1: Shohei Komeda, Yoshiya Ohnuma, "Dual Active Bridge AC-DC Converter with an Active Energy Buffer", Papers of Technical Meeting on Semiconductor Power Converter, 2021, SPC-21-003, pp. 13-18

SUMMARY OF THE INVENTION

Problem to be Solved by the Invention

A DAB converter contains full-bridge circuits on both the primary and secondary sides. In general, circuits containing full bridge circuits have a dead time during which all switches in a leg containing a switch that is to be switched are in the OFF state before switching from OFF to ON. However, in the control of the charging circuit disclosed in Non-Patent Document 1, if a dead time is provided for all the timings in which the switches of the DAB converter are switched from OFF to ON, distortion occurs in the reactor current and the output current, and the measured value of transmission power becomes smaller than the command value, resulting in a drop in efficiency.

Accordingly, it is an object of the present invention to provide a compact and highly efficient charger capable of absorbing the ripple of the power.

Solution to Problem

In order to solve the above problems, a charger according to one embodiment of the present invention includes: a rectifier including two input terminals for connection to an alternating-current power supply, a cathode terminal, and an anode terminal; a DC/DC converter including a first terminal connected to the cathode terminal of the rectifier via a first line, a second terminal connected to the anode terminal of the rectifier via a second line, and two output terminals for connection to a battery; a power ripple absorption circuit including a first diode, a second diode, a third diode, an inductor, a capacitor, a first switch, and a second switch; and a control unit configured to control switching of switches of the DC/DC converter, the first switch, and the second switch, wherein the first diode is connected between the inductor of the power ripple absorption circuit and one of the input terminals of the rectifier, the second diode is connected between the inductor and the other of the input terminals of the rectifier, the capacitor and the first switch are connected in series between the first line and the second line, the capacitor being provided on a side of the second line, the third diode is connected between: a line connecting the capacitor and the first switch; and the inductor of the power ripple absorption circuit, the second switch is connected between: the second line; and a line connecting the inductor of the power ripple absorption circuit and the third diode, control of the switching of the DC/DC converter by the control unit includes a first mode in which all of the switches of the DC/DC converter are OFF and a plurality of second modes in which at least one of the switches of the DC/DC converter is ON, and when switching from the first mode to one of the plurality of second modes, the control unit does not provide a dead time between the first mode and the one of the plurality of second modes.

ADVANTAGEOUS EFFECTS OF THE INVENTION

According to the present invention, a compact and highly efficient charger capable of absorbing the ripple of the power can be provided.

BRIEF DESCRIPTION OF THE DRAWINGS

FIG. 3 is a table illustrating the states of respective switches in respective modes.

FIG. 7 is a table illustrating the states of respective switches in respective modes.

FIG. 11 is a graph for explaining an output current $I_{dc}$ in a case where a dead time $T_d$ is provided in all of the timings at which the switches S21 to S28 of the DC/DC converter 120 are switched from OFF to ON.

FIG. 14 is a graph for explaining a triangle wave and modulation waves $m_1$ to $m_6$ for obtaining a waveform with the dead time $T_d$ provided for all the timings at which the switches S21 to S28 of the DC/DC converter 120 are switched from OFF to ON.

FIG. 17 is a graph for explaining the output current $I_{dc}$ when the triangle wave and the modulation waves $m_1$ to $m_6$ of FIG. 15 are used.

DETAILED DESCRIPTION OF THE EXEMPLARY EMBODIMENT

<Charger 100>

Figure 1:
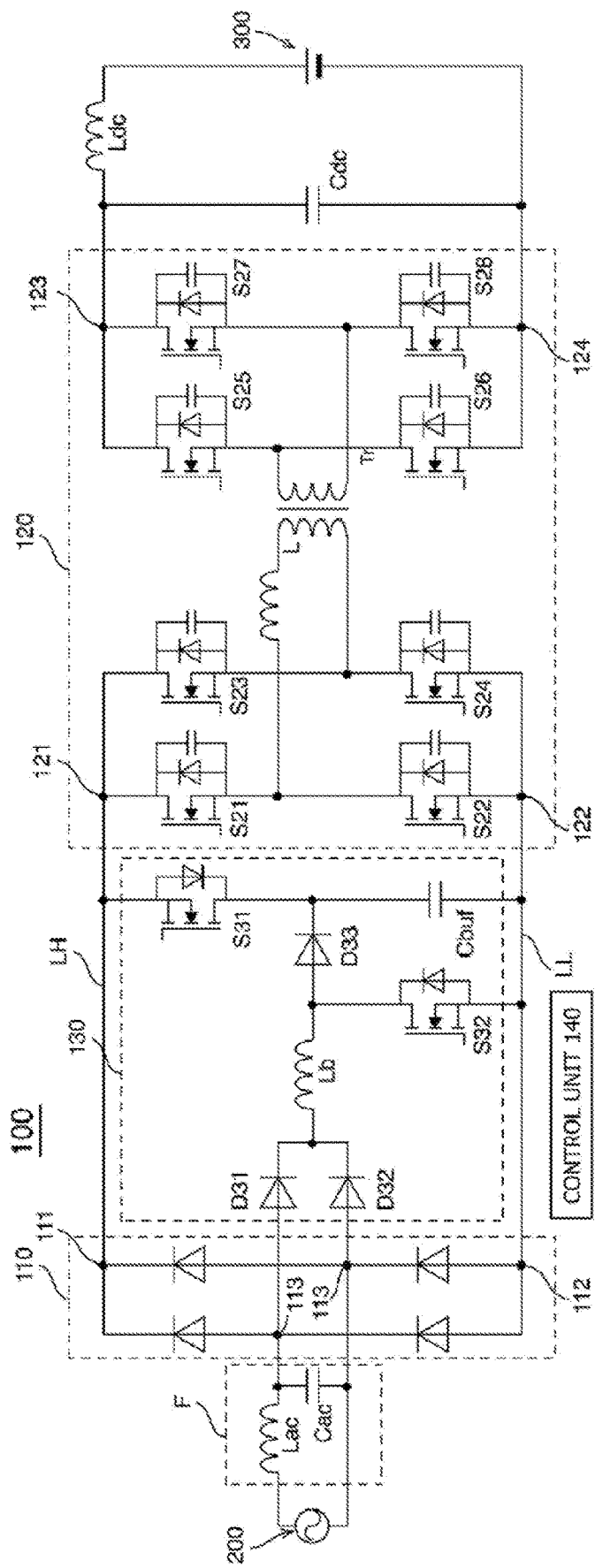
FIG. 1 is a diagram illustrating a charger 100 according to an embodiment of the present invention.

FIG. 1 is a diagram illustrating a charger 100 according to an embodiment of the present invention. The charger 100 includes a rectifier 110, a DC/DC converter 120, a power ripple absorption circuit 130, and a control unit 140. The charger 100 converts a single-phase alternating-current voltage $v_s$ received from a single-phase alternating-current power supply 200 into a direct-current voltage $V_{dc}$, and outputs the direct-current voltage $V_{dc}$ to a battery 300.

The rectifier 110 includes: a cathode terminal 111 and an anode terminal 112 connected to the DC/DC converter 120; and two input terminals 113 for connection to the alternating-current power supply 200. For example, as illustrated in FIG. 1, the rectifier 110 is a bridge diode rectifier constituted by four diodes, which converts, into a direct-current current, the alternating-current current that is input across the two input terminals 113 connected to the alternating-current power supply, and outputs the direct-current current from the cathode terminal 111. As illustrated in FIG. 1, the rectifier 110 may be connected to the alternating-current power supply 200 via a filter F including an inductor Lac and a capacitor Cac.

The DC/DC converter 120 is, for example, a dual active bridge (DAB) converter. The DC/DC converter 120 includes a first terminal 121 connected to the cathode terminal 111 of the rectifier 110, a second terminal 122 connected to the anode terminal 112 of the rectifier 110, a third terminal 123 connected to the positive electrode of the battery 300, and a fourth terminal 124 connected to the negative electrode of the battery 300. The DC/DC converter 120 includes: a transformer Tr; a full-bridge circuit including four switches, i.e., a first switch S21, a second switch S22, a third switch S23, and a fourth switch S24, on the input side (primary side); and a full-bridge circuit including four switches, i.e., a fifth switch S25, a sixth switch S26, a seventh switch S27, and an eighth switch S28, on the output side (secondary side). The transformer Tr is interposed between the full-bridge circuit on the input side (primary side) and the full-bridge circuit on the output side (secondary side). Each of the eight the switches S21 to S28 is, for example, an N-channel power metal-oxide-semiconductor field-effect transistor (MOSFET) with an opposite polarity diode (a body diode). In this case, the N-channel power MOSFET may have a snubber capacitor as shown in FIG. 1.

The full-bridge circuit on the primary side of the DC/DC converter 120 includes two legs (i.e., a leg including the first switch S21 and the second switch 22 and a leg including the third switch S23 and the fourth switch S24) connected between the first terminal 121 and the second terminal 122, and the full-bridge circuit on the secondary side of the DC/DC converter 120 includes two legs (i.e., a leg including the fifth switch S25 and the sixth switch 26 and a leg including the seventh switch S27 and the eighth switch S28) connected between the third terminal 123 and the fourth terminal 124.

The DC/DC converter 120 has an inductor L on the primary side of the transformer Tr. The inductor L has, for example, a leakage inductor of the transformer Tr.

Also, a direct-current capacitor Cdc is connected between the third terminal 123 and the fourth terminal 124 of the DC/DC converter 120. An inductor Ldc may be connected between the third terminal 123 of the DC/DC converter 120 and the positive electrode of the battery 300.

The power ripple absorption circuit 130 includes a first diode D31, a second diode D32, a third diode D33, an inductor Lb, a buffer capacitor Cbuf, a first switch S31, and a second switch S32.

The first diode D31 of the power ripple absorption circuit 130 is connected between the inductor Lb of the power ripple absorption circuit 130 and one of the two input terminals 113 of the rectifier 110, and the second diode D32 of the power ripple absorption circuit 130 is connected between the inductor Lb of the power ripple absorption circuit 130 and the other of the two input terminals 113 of the rectifier 110. In this case, the first diode D31 and the second diode D32 of the power ripple absorption circuit 130 are connected between the inductor Lb of the power ripple absorption circuit 130 and the input terminals 113 of the rectifier 110, in such a manner that the forward direction of the first diode D31 and the second diode D32 is the direction from the input terminal 113 of the rectifier 110 to the inductor Lb. Accordingly, even though the alternating-current power supply 200 is connected to the input terminals 113 of the rectifier 110, the inductor Lb of the power ripple absorption circuit 130 receives direct current.

The buffer capacitor Cbuf and the first switch S31 of the power ripple absorption circuit 130 are connected in series between: a first line LH connecting the cathode terminal 111 of the rectifier 110 and the first terminal 121 of the DC/DC converter 120; and a second line LL connecting the anode terminal 112 of the rectifier 110 and the second terminal 122 of the DC/DC converter 120. The buffer capacitor Cbuf is provided on the side of the second line LL, and the first switch 31 is provided on the side of the first line LH. The first switch S31 is, for example, an N-channel power metal-oxide-semiconductor field-effect transistor (MOSFET) with an opposite polarity diode (body diode). In this case, the source of the N-channel power MOSFET may be connected to the first line LH, and the drain of the N-channel power MOSFET may be connected to the buffer capacitor.

The third diode D33 of the power ripple absorption circuit 130 is connected between: a line connecting the buffer capacitor Cbuf and the first switch S31 of the power ripple absorption circuit 130; and the inductor Lb of the power ripple absorption circuit 130, in such a manner that the forward direction of the third diode D33 is the direction from the inductor Lb to this line.

The second switch S32 of the power ripple absorption circuit 130 is connected between the second line LL and a line connecting the inductor Lb and the third diode D33 of the power ripple absorption circuit 130. The second switch S32 is, for example, an N-channel power metal-oxide-semiconductor field-effect transistor (MOSFET) with an opposite polarity diode (body diode). In this case, the drain of the N-channel power MOSFET may be connected to a line connecting the inductor Lb and the third diode D33 of the power ripple absorption circuit 130, and the source of the N-channel power MOSFET may be connected to the second line LL.

The control unit 140 controls switching of the switches S21 to S28 of the DC/DC converter 120 and the switches S31, S32 of the power ripple absorption circuit 130.

Because the power ripple absorption circuit 130 includes the first diode D31, the second diode D32, the third diode D33, the inductor Lb, the buffer capacitor Cbuf, and the second switch S32, the power ripple absorption circuit 130 can function as a power factor correction (PFC) circuit. For this reason, in the present embodiment, control can be performed so that a sine wave voltage $v_s$ and a sine wave current $i_s$ as explained below are input from the alternating-current power supply 200 to the charger 100.

$$v_s(t) = \sqrt{2}V_s \sin\omega_s t$$

$$i_s(t) = \sqrt{2}I_s \sin\omega_s t \qquad \text{[Math 1]}$$

$V_s$ denotes the effective value of the power supply voltage, and $I_s$ denotes the effective value of the power supply current.

Figure 2:
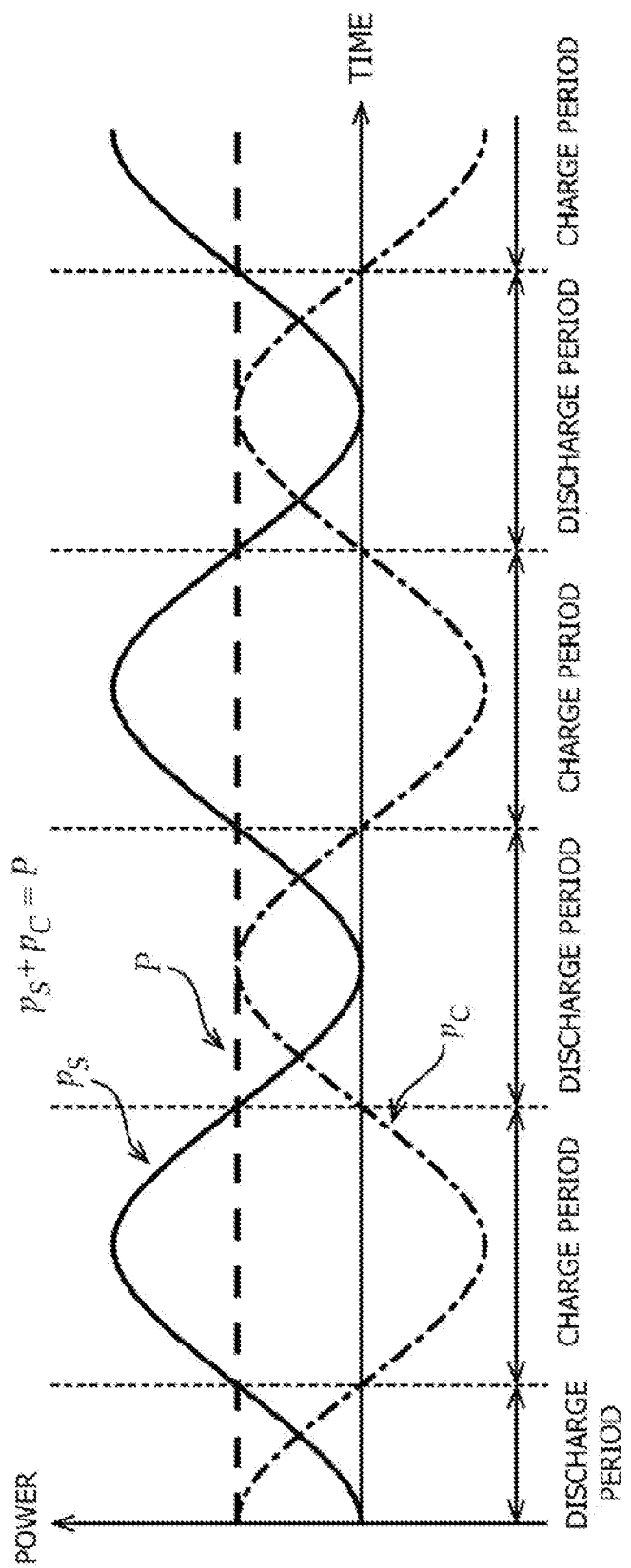
FIG. 2 is a graph illustrating a relationship between an instantaneous power $p_s$ that is output from an alternating-current power supply and an instantaneous power $p_c$ that is output from a buffer capacitor Cbuf.

In this case, as indicated below, the instantaneous power $p_s$ that is output from the alternating-current power supply 200 is a sum of an average power P ($=V_s I_s$) and a ripple portion $p_{rip}(t)$ ($=-V_s I_s \cos 2\omega_s t$), and as indicated by a solid line in FIG. 2, and ripples at an angular frequency twice an angular frequency ωS of the alternating current, with respect to the average power P (broken line of FIG. 2).

$$p_s(t) = v_s i_s = V_s I_s (1 - \cos 2\omega_s t) = P + p_{rip}(t) \qquad \text{[Math 2]}$$

Accordingly, the control unit 140 controls the switches S21 to S28 of the DC/DC converter 120 and the switches S31, S32 of the power ripple absorption circuit 130, so that the power ripple absorption circuit 130 absorbs the ripple of the power from the alternating-current power supply to make the power provided to the DC/DC converter 120 constant.

In this case, the charger 100 according to the present embodiment changes the control between when the instantaneous power $p_s$ that is output from the alternating-current power supply 200 is higher than the average power P ($p_s>P$) and when the instantaneous power $p_s$ that is output from the alternating-current power supply 200 is lower than the average power P ($p_s<P$).

When the instantaneous power $p_s$ that is output from the alternating-current power supply 200 is higher than the average power P ($p_s>P$), switching of the eight switches S21 to S28 of the DC/DC converter 120 and the two switches S31, S32 of the power ripple absorption circuit 130 is controlled, so that the ripple portion $p_{rip}$ of the instantaneous power $p_s$ that is output from the alternating-current power supply 200 is charged to the buffer capacitor Cbuf via the inductor Lb of the power ripple absorption circuit 130, and accordingly, only the average power P of the power that is output from the alternating-current power supply is provided to the DC/DC converter 120. In other words, in the present embodiment, the period in which the instantaneous power $p_s$ that is output from the alternating-current power supply 200 is higher than the average power P is a period (charge period) in which the buffer capacitor Cbuf is charged, and in which the instantaneous power pC that is output from the buffer capacitor Cbuf is negative as indicated by a long dashed short dashed line in FIG. 2.

On the other hand, when the instantaneous power $p_s$ that is output from the alternating-current power supply 200 is lower than the average power P ($p_s<P$), the second switch S32 of the power ripple absorption circuit 130 keeps the OFF state and controls switching of the eight switches S21 to S28 of the DC/DC converter 120 and the first switch S31 of the power ripple absorption circuit 130 to actively discharge the buffer capacitor Cbuf via the first switch S31, so that the ripple portion $p_{rip}$ that is the difference between the average power P and the instantaneous power $p_s$ that is output from the alternating-current power supply 200 is compensated for, and accordingly, the average power P is provided to the DC/DC converter 120. In other words, in the present embodiment, the period in which the instantaneous power $p_s$ that is output from the alternating-current power supply 200 is lower than the average power P is a period (discharge period) in which the buffer capacitor Cbuf is discharged, and in which the instantaneous power pC that is output from the buffer capacitor Cbuf is positive as indicated by the long dashed short dashed line in FIG. 2.

Therefore, in the present embodiment, the control unit 140 controls switching of the switches S21 to S28 of the DC/DC converter 120 and the switches S31 to S32 of the power ripple absorption circuit 130, so that the sum of the instantaneous power $p_s$ that is output from the alternating-current power supply 200 and the instantaneous power pC that is output from the buffer capacitor Cbuf becomes constant.

In this manner, in the present embodiment, the buffer capacitor Cbuf is actively discharged in the discharge period. For this reason, in the present embodiment, the amount of power accumulated in the buffer capacitor Cbuf (i.e., the capacity of the buffer capacitor Cbuf) can be reduced, and the size of the buffer capacitor Cbuf can be reduced.

Furthermore, in the present embodiment, the second switch S32 is activated only in the charge period. For this reason, in the present embodiment, the amount of power accumulated in the inductor Lb (i.e., the inductance of the inductor Lb) can be reduced, and the size of the inductor Lb can be reduced.

Furthermore, in the present embodiment, the power provided to the DC/DC converter 120 does not have ripple. For this reason, in the present embodiment, the transformer Tr of the DC/DC converter 120 and the direct-current capacitor Cdc can be reduced in size.

As described above, in the present embodiment, the sizes of passive devices such as capacitors, inductors, and transformers can be reduced. Therefore, in the present embodiment, the compact and highly efficient charger capable of absorbing the ripple of the power can be provided.

<Switching Modes and Operation Waveforms>

The control unit 140 controls switching of the switches S21 to S28 of the DC/DC converter 120 and the first switch S31 of the power ripple absorption circuit 130 according to seven modes, so that an operation waveform $i_L$, of the inductor L of the DC/DC converter 120 attains an operation waveform that can be approximated by square waveforms. FIG. 3 is a table illustrating the states of respective switches in the seven modes. The seven modes include a mode (mode 5) in which all of the switches S21 to S28 of the DC/DC converter 120 and the first switch S31 of the power ripple absorption circuit 130 are in the OFF state.

Figure 4:
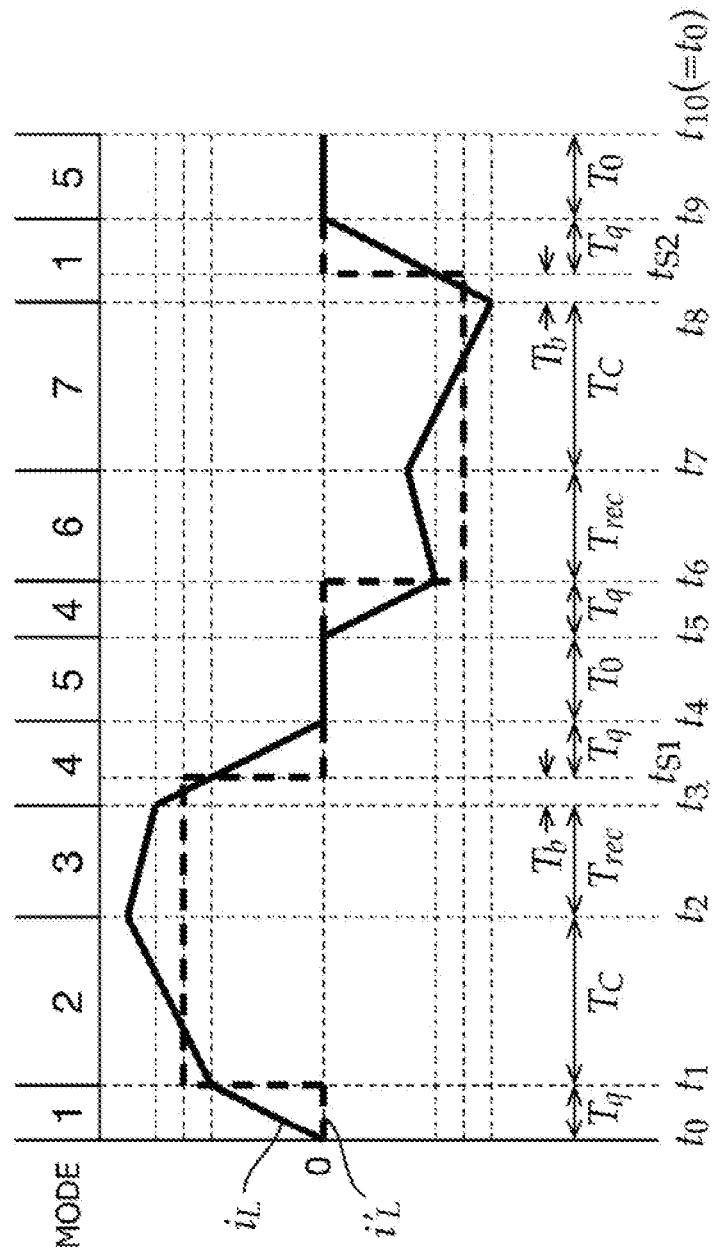
FIG. 4 is a graph illustrating an operation waveform $i_L$ of an inductor L of a DC/DC converter 120 according to the present embodiment and an equivalent square wave thereof (buck sequence).

FIG. 4 is a graph illustrating the operation waveform $i_L$ of the inductor L of the DC/DC converter 120 according to the present embodiment and an equivalent square wave $i_{L'}$ thereof. This operation waveform $i_L$ is obtained by switching the seven modes as illustrated in FIG. 3 in the order of: mode 1, mode 2, mode 3, mode 4, mode 5, mode 4, mode 6, mode 7, mode 1, and mode 5. In this case, the current $i_L$ in each of the seven modes is as follows (see Non-Patent Document 1).

[Math 3]

$$i_L(t) = \begin{cases} \frac{v_C + V_{dc}}{L}(t - t_{c1}) + i_L(t_{c1}) & \text{(MODE 1)} \\ \frac{v_C - V_{dc}}{L}(t - t_{c2}) + i_L(t_{c2}) & \text{(MODE 2)} \\ \frac{v_{rec} - V_{dc}}{L}(t - t_{c3}) + i_L(t_{c3}) & \text{(MODE 3)} \\ -\frac{v_C + V_{dc}}{L}(t - t_{c4}) + i_L(t_{c4}) & \text{(MODE 4)} \\ 0 & \text{(MODE 5)} \\ -\frac{v_{rec} - V_{dc}}{L}(t - t_{c6}) + i_L(t_{c6}) & \text{(MODE 6)} \\ -\frac{v_C + V_{dc}}{L}(t - t_{c7}) + i_L(t_{c7}) & \text{(MODE 7)} \end{cases} \quad (1)$$

In this case, $t_{cn}$ (n=1 to 7) denotes a time at which the mode is switched to mode n.

In the present embodiment, in order to actively discharge the buffer capacitor Cbuf when the first switch S31 of the power ripple absorption circuit 130 is in the ON state, the control unit 140 performs control so that the voltage $v_C$ applied to the buffer capacitor Cbuf is always greater than the instantaneous voltage $v_{rec}$ that is output from the rectifier 110. Accordingly, in the present embodiment, the voltage $v_C$ applied to the buffer capacitor Cbuf has a value different from the instantaneous voltage $v_{rec}$ of the rectifier 110, and the inclination of the operation waveform $i_L$ is different between mode 2 and mode 3. Likewise, the inclination of the operation waveform $i_L$ is different between mode 6 and mode 7. Therefore, in the present embodiment, as illustrated in FIG. 4, the operation waveform can be generated such that the waveform in the positive region and the waveform in the negative region are asymmetrical about $i_L=0$.

In the operation waveform $i_L$ as illustrated in FIG. 4, $t_0$ to $t_{10}$ are set such that $|t_0-t_1|=|t_5-t_6|$, $|t_1-t_2|=|t_7-t_8|$, $|t_2-t_3|=|t_6-t_7|$, and $|t_3-t_4|=|t_8-t_9|$, and $t_{S1}$ is set between $t_3$ and $t_4$, and $t_{S2}$ is set between $t_8$ and $t_9$ such that $|t_0-t_1|=|t_{S1}-t_4|=|t_{S2}-t_9|$. In this case, the operation waveform $i_L$ can be approximated by the equivalent square waveform $i_L'$.

[Math 4]

$$i_L'(t) = \begin{cases} \frac{i_L(t_1) + i_L(t_3)}{2} = I_L' & (t_1 \leq t \leq t_{S1}) \\ -I_L' & (t_6 \leq t \leq t_{S2}) \\ 0 & (t_0 \leq t < t_1, t_{S1} < t < t_6, t_{S2} < t < t_{10}) \end{cases}$$

In the equivalent square waveform $i_L'$, a period at $t_0 \leq t < t_1$, $t_{S1} \leq t < t_4$, $t_5 \leq t < t_6$, $t_{S2} \leq t < t_9$ is defined as a reactive current period $T_q$, a period at $t_1 \leq t < t_2$, $t_7 \leq t < t_8$ is defined as a buffer capacitor discharge current period $T_C$, a period at $t_2 \leq t < t_3$, $t_6 \leq t < t_7$ is defined as a power supply current period $T_{rec}$, a period at $t_3 \leq t < t_{S1}$, $t_8 \leq t < t_{S2}$ is defined as a current balance period $T_b$, and a period at $t_4 \leq t < t_5$, $t_9 \leq t < t_{10}$ is defined as a zero-current period $T_0$. In this case, the duty cycle of each period in the switching period $T_{SW}$ is as follows.

[Math 5]

$$\begin{cases} D_q = \frac{2T_q}{T_{SW}} = \frac{2I_L'L}{(v_C + V_{dc})T_{SW}} - \frac{D_b}{2} \\ D_C = \frac{2T_C}{T_{SW}} = \frac{i_C}{I_L'} + D_b = \frac{(v_{rec} - V_{dc})i_{rec} + (v_C + V_{dc})i_C}{2V_{dc}I_L'} \\ D_{rec} = \frac{2T_{rec}}{T_{SW}} = \frac{i_{rec}}{I_L'} \\ D_b = \frac{2T_b}{T_{SW}} = \frac{(v_{rec} - V_{dc})i_{rec} + (v_C - V_{dc})i_C}{2V_{dc}I_L'} \\ D_0 = \frac{2T_0}{T_{SW}} = 1 - (2D_q + D_C + D_{rec} + D_b) \end{cases} \quad (2)$$

The duty cycle of each period can be obtained by giving $i_{rec}$, $v_C$, $V_{dc}$, $I_L'$ as command values. The control law for the operation waveform $i_L$ of FIG. 4 can be obtained by using the obtained duty cycle of each period. Among the command values, command value $i_{rec}^*$, $i_C^*$ of $i_{rec}$ and $i_C$ are switched between the discharge period and the charge period as follows, so that the power ripple absorption circuit 130 is caused to function as a PFC circuit and circuit for absorbing the ripple of the power.

[Math 6]

$$i_{rec}^* = \begin{cases} \sqrt{2}\frac{P}{V_S}|\sin\omega_S t| & \text{(DISCHARGE PERIOD)} \\ \frac{P}{\sqrt{2}V_S|\sin\omega_S t|} & \text{(CHARGE PERIOD)} \end{cases}$$

$$i_C^* = \begin{cases} \frac{P}{v_C}\cos\omega_S t & \text{(DISCHARGE PERIOD)} \\ 0 & \text{(CHARGE PERIOD)} \end{cases}$$

<Switching Control During Boost Operation>

Figure 5:
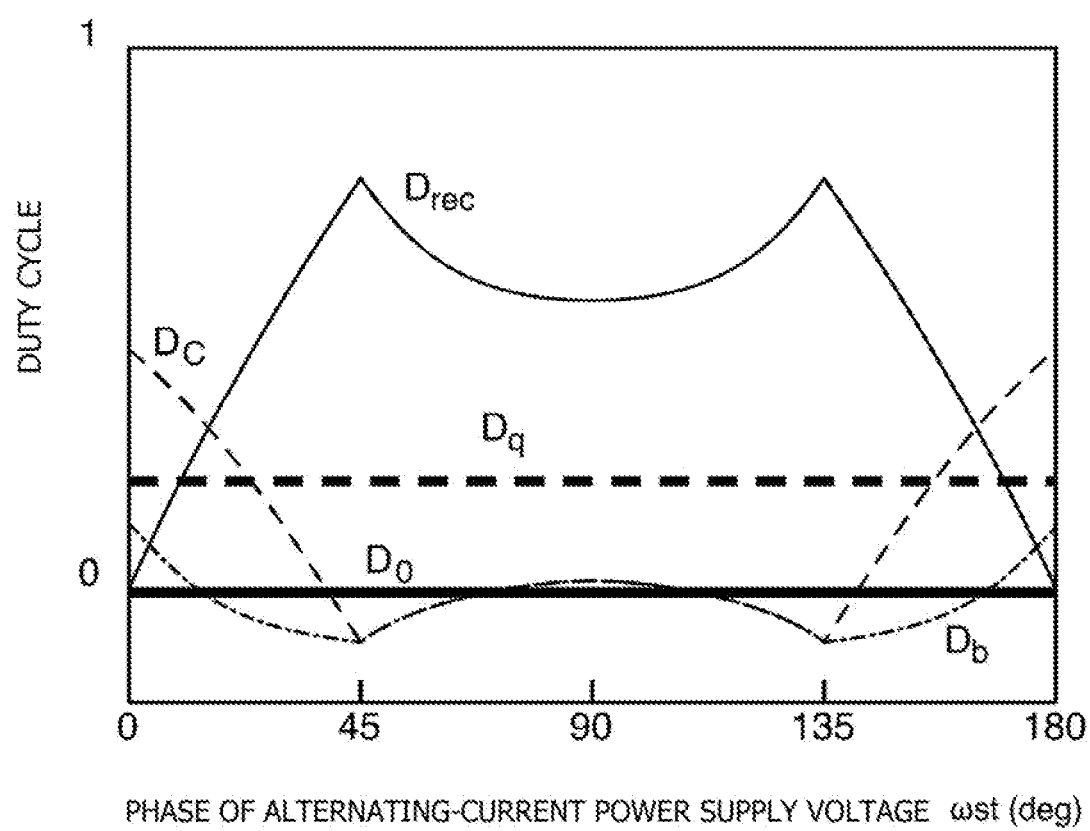
FIG. 5 is a graph illustrating an example of calculation of a duty cycle for each period according to a conventional control method.

According to the above-described control, in order to operate the charger 100, all of the duty cycles of the above expression (2) are required to be positive. During the buck operation (i.e., $V_S > V_{dc}$), all of the duty cycles of the above expression (2) are positive, but during the boost operation (i.e., $V_S < V_{dc}$), the duty cycle $D_b$ of the current balance period $T_b$ and the duty cycle $D_C$ of the buffer capacitor discharge current period $T_C$ may be negative, as illustrated in FIG. 5. In the example as illustrated in FIG. 5, when the phase $\omega_{st}$ of the alternating-current power supply voltage $v_S$ is zero degrees, both the duty cycle $D_b$ of the current balance period $T_b$ and the duty cycle $D_C$ of the buffer capacitor discharge current period $T_C$ are positive, but when the phase $\omega_{st}$ of the alternating-current power supply voltage $v_S$ becomes approximately 15 degrees, the duty cycle $D_b$ of the current balance period $T_b$ becomes negative, and when the phase $\omega_{st}$ of the alternating-current power supply voltage $v_S$ becomes approximately 45 degrees, the duty cycle $D_C$ of the buffer capacitor discharge current period $T_C$ becomes negative. When the duty cycle $D_b$ of the current balance period $T_b$ is negative, the following expression can be derived from the above expression (2).

[Math 7]

$$(v_{rec} - V_{dc})i_{rec} + (v_C - V_{dc})i_C < 0 \quad (3)$$

When the duty cycle $D_C$ of the buffer capacitor discharge current period $T_C$ is negative, the following expression holds.

[Math 8]

$$(v_{rec} - V_{dc})i_{rec} + (v_C + V_{dc})i_C < 0 \quad (4)$$

Therefore, in the present embodiment, when the duty cycle $D_b$ of the current balance period $T_b$ becomes negative (i.e., the above expression (3) becomes satisfied), the switching control is changed, and when the duty cycle $D_C$ of the buffer capacitor discharge current period $T_C$ becomes negative (i.e., the above expression (4) becomes satisfied), the switching control is further changed. Hereinafter, the control that is performed when both the above expression (3) and (4) are not satisfied, i.e., the control explained above, is referred to as a buck sequence, the control that is performed when the above expression (3) is satisfied but the above expression (4) is not satisfied is referred to as a boost sequence I, and the control that is performed when both the above expression (3) and (4) are satisfied is referred to as a boost sequence II.

(Boost Sequence I)

Figure 6:
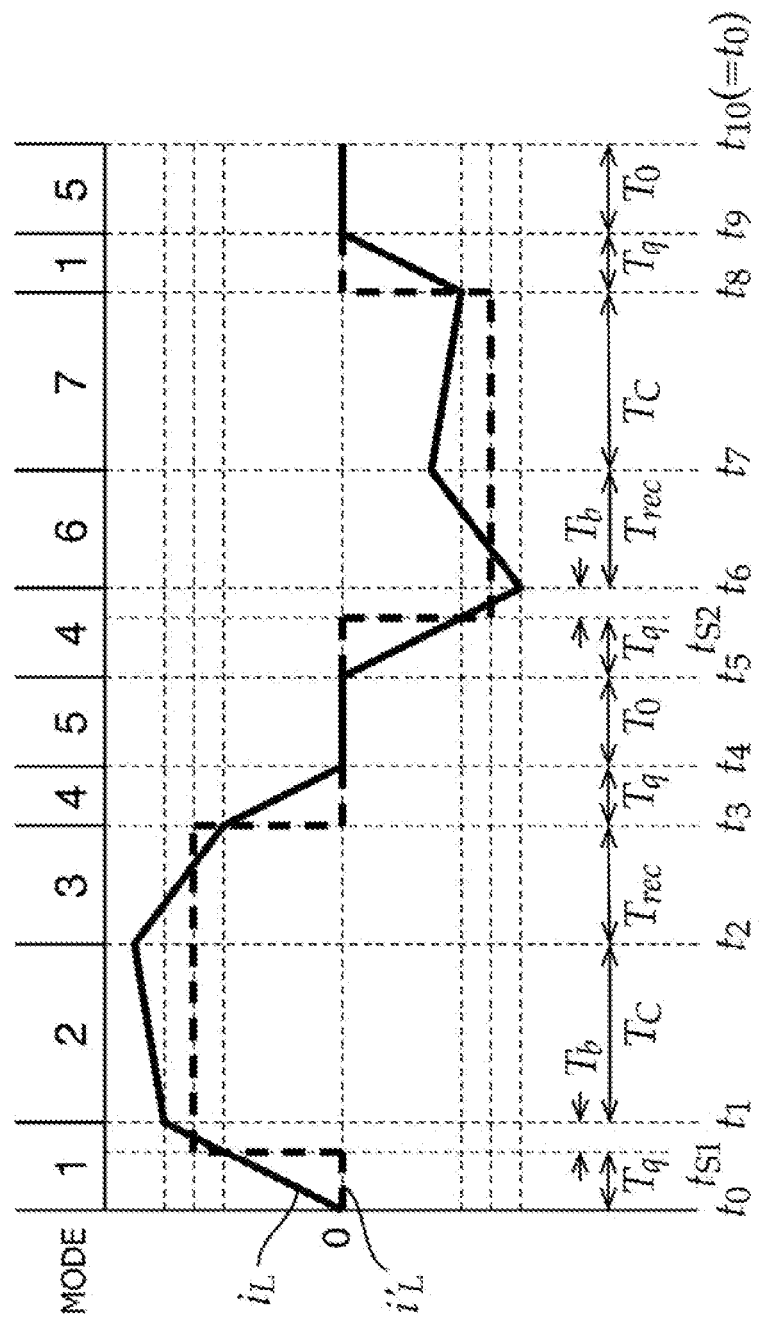
FIG. 6 is a graph illustrating an operation waveform $i_L$ of the inductor L of the DC/DC converter 120 according to the present embodiment and an equivalent square wave $i_L'$ thereof (boost sequence I).

In the operation waveform $i_L$ as illustrated in FIG. 4 (the operation waveform during the buck sequence), $i_L(t_1) \leq i_L(t_3)$ holds. However, when the duty cycle $D_b$ of the current balance period $T_b$ becomes negative (i.e., the above expression (3) becomes satisfied), the operation waveform $i_L$ is such that $i_L(t_i) > i_L(t_3)$, as illustrated in FIG. 6. Therefore, in the present embodiment, when the above expression (3) is satisfied, and the above expression (4) is not satisfied, $t_0$ to $t_{10}$ are set such that $|t_0-t_1|=|t_5-t_6|$, $|t_1-t_2|=|t_7-t_8|$, $|t_2-t_3|=|t_6-t_7|$, and $|t_3-t_4|=|t_8-t_9|$, and $t_{S1}$ is set between $t_0$ and $t_1$, and $t_{S2}$ is set between $t_5$ and $t_6$, such that $|t_0-t_{S1}|=|t_3-t_4|=|t_5-t_{S2}|$ whereby the operation waveform $i_L$ is approximated by the following equivalent square waveform $i_L'$.

[Math 9]

$$i_L'(t) = \begin{cases} \dfrac{i_L(t_1)+i_L(t_3)}{2} = I_L' & (t_{S1} \leq t \leq t_3) \\ -I_L' & (t_{S2} \leq t \leq t_8) \\ 0 & (t_0 \leq t < t_{S1},\ t_3 < t < t_{S2},\ t_8 < t < t_{10}) \end{cases}$$

In the equivalent square waveform $i_L'$, a period at $t_0 \leq t < t_{S1}$, $t_3 \leq t < t_4$, $t_5 \leq t < t_{S2}$, $t_8 \leq t < t_9$ is defined as a reactive current period $T_q$, a period at $t_1 \leq t < t_2$, $t_7 \leq t < t_8$ is defined as a buffer capacitor discharge current period $T_C$, a period at $t_2 \leq t < t_3$, $t_6 \leq t < t_7$ is defined as a power supply current period $T_{rec}$, a period at $t_{S1} \leq t < t_1$, $t_{S2} \leq t < t_6$ is defined as a current balance period $T_b$, and a period at $t_4 \leq t < t_5$, $t_9 \leq t < t_{10}$ is defined as a zero-current period $T_0$. In this case, the duty cycle of each period in the switching period $T_{SW}$ is as follows.

[Math 10]

$$\begin{cases} D_q &= \dfrac{2I_L'L}{(v_C+V_{dc})T_{SW}} - \dfrac{D_b}{2} \\ D_C &= \dfrac{i_C}{I_L'} - D_b = \dfrac{(v_{rec}-V_{dc})i_{rec}+(v_C+V_{dc})i_C}{2V_{dc}I_L'} \\ D_{rec} &= \dfrac{i_{rec}}{I_L'} \\ D_b &= -\dfrac{(v_{rec}-V_{dc})i_{rec}+(v_C-V_{dc})i_C}{2V_{dc}I_L'} \\ D_0 &= 1-(2D_q+D_C+D_{rec}+D_b) \end{cases} \quad (5)$$

For the boost sequence I, the duty cycle of each period can also be obtained by giving $i_{rec}$, $i_C$, $vC$, $V_{dc}$, $I_L'$, as command values. By using the duty cycle of each period thus obtained, the control law for the operation waveform $i_L$ (boost sequence I) of FIG. 6 can be obtained.

(Boost Sequence II)

Figure 8:
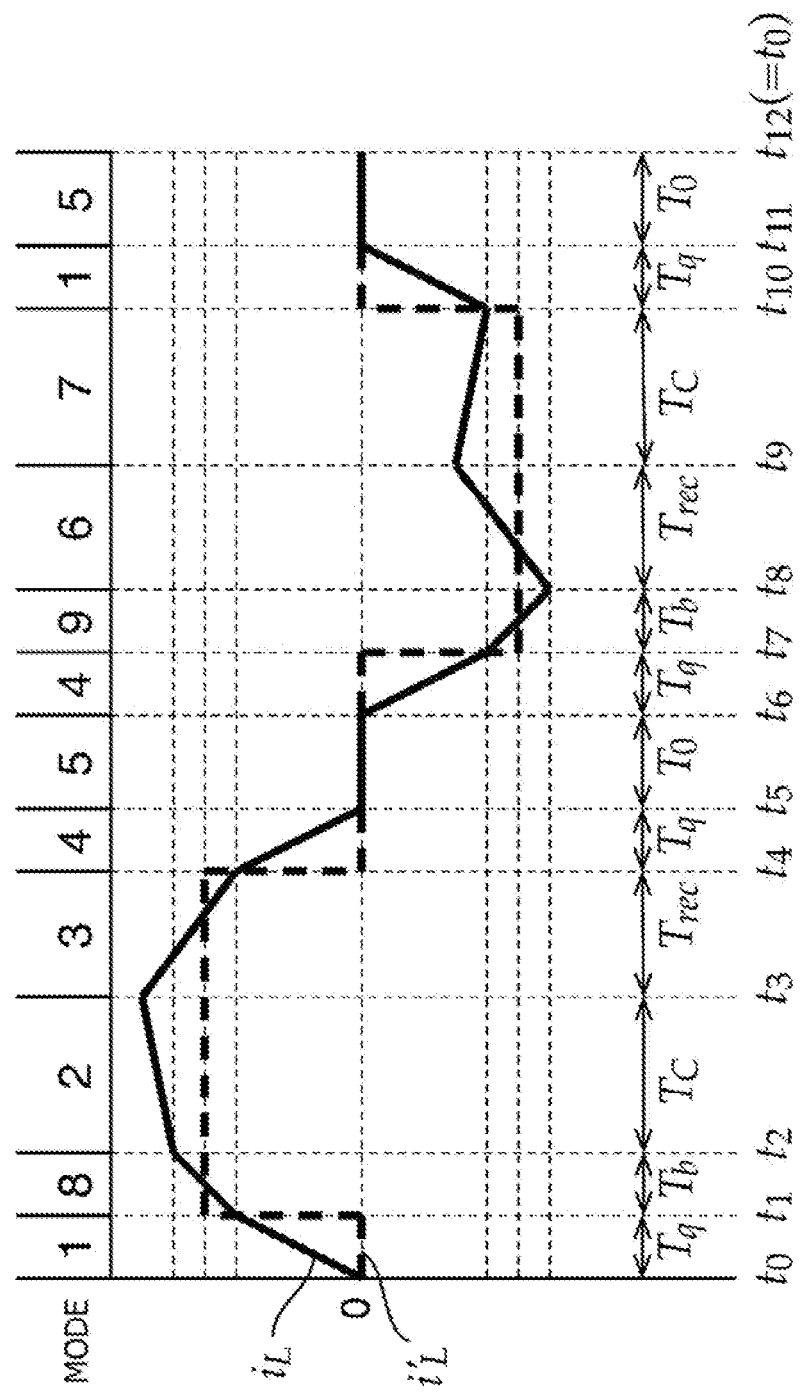
FIG. 8 is a graph illustrating an operation waveform iL $i_L$ of the inductor L of the DC/DC converter 120 according to the present embodiment and an equivalent square wave $i_L'$ thereof (boost sequence II).

Furthermore, in the present embodiment, when both of the above expressions (3) and (4) are satisfied, switching of the switches S21 to S28 of the DC/DC converter 120 and the first switch S31 of the power ripple absorption circuit 130 is controlled according to nine modes as illustrated in FIG. 7, including not only the seven modes as illustrated in FIG. 3 but also additional two modes. By performing control in this way, the operation waveform $i_L$ as illustrated in FIG. 8 is obtained. This operation waveform $i_L$ as illustrated in FIG. 8 is obtained by switching the nine modes as illustrated in FIG. 7 in the order of: mode 1, mode 8, mode 2, mode 3, mode 4, mode 5, mode 4, mode 9, mode 6, mode 7, mode 1, and mode 5.

Then, in the operation waveform $i_L$ as illustrated in FIGS. 8, $t_0$ to $t_{12}$ are set such that $|t_0-t_1|=|t_6-t_7|$, $|t_1-t_2|=|t_7-t_8|$, $|t_2-t_3|=|t_9-t_{10}|$, $|t_3-t_4|=|t_8-t_9|$, $|t_4-t_5|=|t_{10}-t_{11}|$, and $|t_5-t_6|=|t_{11}-t_{12}|$. In this case, the operation waveform $i_L$ can be approximated by the equivalent square waveform $i_L'$.

[Math 11]

$$i_L'(t) = \begin{cases} \dfrac{i_L(t_1)+i_L(t_4)}{2} = I_L' & (t_1 \leq t \leq t_4) \\ -I_L' & (t_7 \leq t \leq t_{10}) \\ 0 & (t_0 \leq t < t_1,\ t_4 < t < t_7,\ t_{10} < t < t_{12}) \end{cases}$$

In the equivalent square waveform $i_L'$, a period at $t_0 \leq t < t_1$, $t_4 \leq t < t_5$, $t_6 \leq t < t_7$, $t_1 \leq t < t_1 1$ is defined as a reactive current period $T_q$, a period at $t_2 \leq t < t_3$, $t_9 \leq t < t_{10}$ is defined as a buffer capacitor discharge current period $T_C$, a period at $t_3 \leq t < t_4$, $t_8 \leq t < t_9$ is defined as a power supply current period $T_{rec}$, a period at $t_1 \leq t < t_2$, $t_7 \leq t < t_8$ is defined as a power supply current period $T_{rec}$, a period at $t_1 \leq t < t_2$, $t_7 \leq t < t_8$ is defined as a current balance period $T_b$, and a period at $t_5 \leq t < t_6$, $t_{11} \leq t < t_{12}$ is defined as a zero-current period $T_0$. In this case, the duty cycle of each period in the switching period $T_{SW}$ is as follows

[Math 12]

$$\begin{cases} D_q &= \dfrac{2I_L'L}{(v_C+V_{dc})T_{SW}} - \dfrac{v_{rec}+V_{dc}}{v_C+V_{dc}}\dfrac{D_b}{2} \\ D_C &= \dfrac{i_C}{I_L'} \\ D_{rec} &= \dfrac{i_{rec}}{I_L'} - D_b = \dfrac{(v_{rec}-V_{dc})i_{rec}+(v_C-V_{dc})i_C}{2V_{dc}I_L'} \\ D_b &= -\dfrac{(v_{rec}-V_{dc})i_{rec}+(v_C-V_{dc})i_C}{2V_{dc}I_L'} \\ D_0 &= 1-(2D_q+D_C+D_{rec}+D_b) \end{cases} \quad (6)$$

For the boost sequence II, the duty cycle of each period can also be obtained by giving $i_{rec}$, $i_C$, $v_C$, $V_{dc}$, $I_L'$, as command values. By using the duty cycle of each period thus obtained, the control law for the operation waveform $i_L$ (boost sequence II) of FIG. 8 can be obtained.

(Operation of Charger 100)

Figure 9:
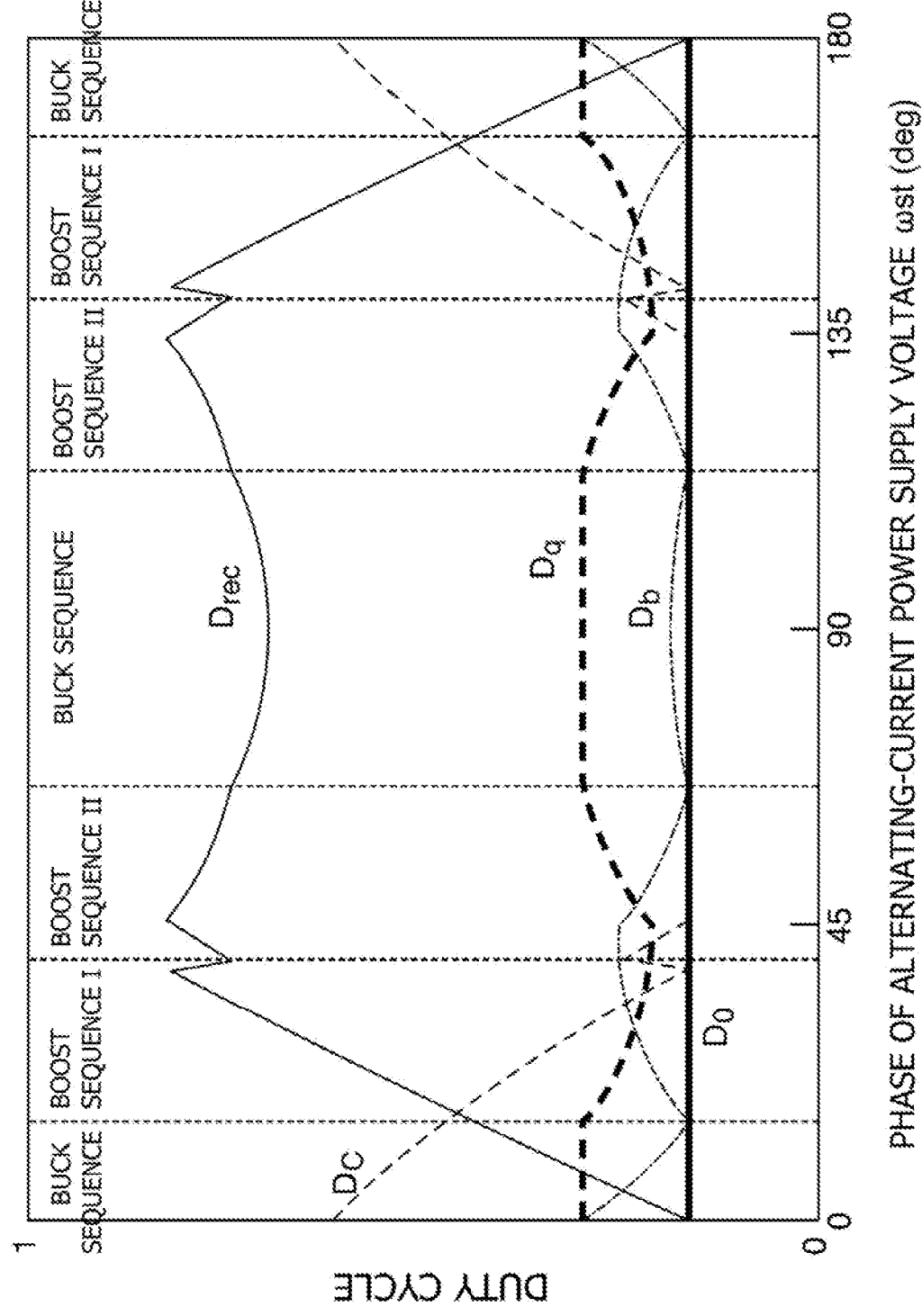
FIG. 9 is a graph illustrating duty cycles when the charger 100 is operated using three controls, i.e., the buck sequence, the boost sequence I, and the boost sequence II.

FIG. 9 is a graph illustrating duty cycles when the charger 100 is operated using three controls, i.e., the buck sequence, the boost sequence I, and the boost sequence II. As illustrated in FIG. 9, by changing the switching control in the order of: buck sequence, boost sequence I, boost sequence II, buck sequence, boost sequence II, and boost sequence I, the charger 100 can be operated even during the boost operation.

<Setting of Dead Time>

The DAB converter includes full-bridge circuits on both the primary side and the secondary side. In general, in a circuit including a full-bridge circuit, when a switch is switched from OFF to ON, a dead time in which all the switches in the leg including the switch that is to be switched are turned OFF is provided in order to prevent all the switches in the same leg from turning ON and shorting the circuit. Therefore, with the charger 100 according to the present embodiment, it is considered to provide, for all of the timings at which the switches S21 to S28 of the DC/DC converter 120 are switched from OFF to ON, a dead time in which all the switches in the leg including the switch that is to be switched are turned OFF.

Figure 10:
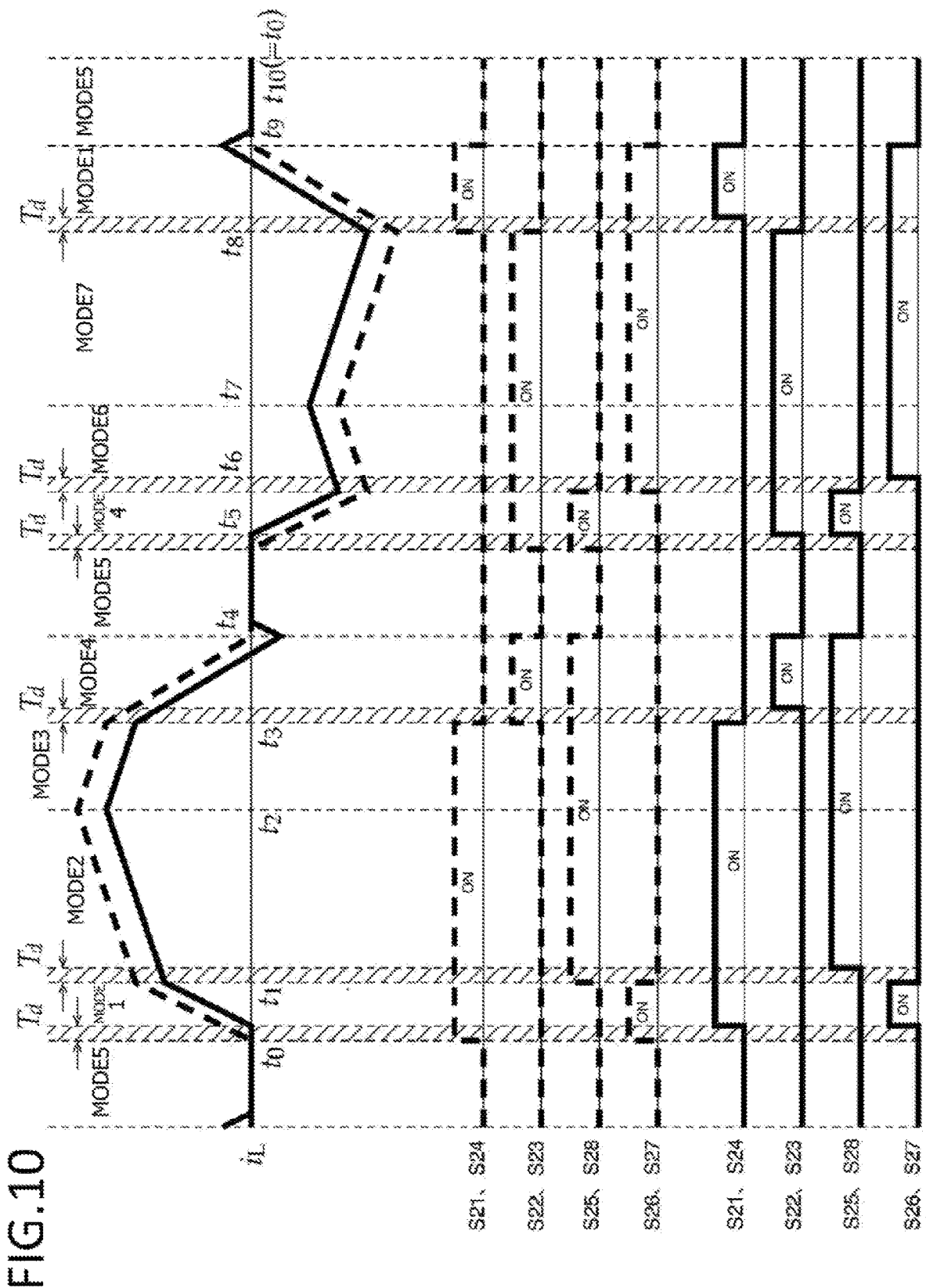
FIG. 10 is a graph for explaining a current $i_L$ of the inductor L of the DC/DC converter 120 and switching of switches S21 to S28.

FIG. 10 is a graph for explaining the current $i_L$ of the inductor L of the DC/DC converter 120 and switching of the switches S21 to S28. In FIG. 10, a broken line indicates the operation waveform $i_L$ during the buck sequence as illustrated in FIG. 4 and switching of the switches S21 to S28 thereof. As illustrated in FIG. 3 (the broken line of FIG. 10), in the operation waveform $i_L$ during the buck sequence as illustrated in FIG. 4, when switching from mode 5 to mode 1 ($t=t_0$), the switches S21, S24, S26, and S27 are switched from OFF to ON; when switching from mode 1 to mode 2 ($t=t_1$), the switches S25 and S28 are switched from OFF to ON; when switching from mode 3 to mode 4 ($t=t_3$), the switches S22 and S23 are switched from OFF to ON; when switching from mode 5 to mode 4 ($t=t_5$), the switches S22, S23, S25, and S28 are switched from OFF to ON; when switching from mode 4 to mode 6 ($t=t_6$), the switches S26 and S27 are switched from OFF to ON; and when switching from mode 7 to mode 1 ($t=t_8$), the switches S21 and S24 are switched from OFF to ON.

Therefore, during the buck sequence, as illustrated by a solid line in FIG. 10, it is considered to provide a dead time $T_d$ at $t=t_0, t_1, t_3, t_5, t_6,$ and $t_8$. In other words, it is considered to provide the dead time $T_d$ between mode 5 and mode 1, between mode 1 and mode 2, between mode 3 and mode 4, between mode 5 and mode 4, between mode 4 and mode 6, and between mode 7 and mode 1.

As described above, when the dead time $T_d$ is provided for all the timings at which the switches S21 to S28 of the DC/DC converter 120 are switched from OFF to ON, the mode 1 starts at $t=t_0+T_d$. In the mode 5 that is immediately before the mode 1, the value of the current $i_L$ of the inductor L is zero. Therefore, when the start of the mode 1 delays, the current starts to flow to the inductor L with a delay. As a result, as described above, when the dead time $T_d$ is provided for all the timings at which the switches S21 to S28 of the DC/DC converter 120 are switched from OFF to ON, the value of the current $i_L$ of the inductor L at the end of the mode 1 ($t=t_1$) as indicated by the solid line in FIG. 10 is as follows.

[Math 13]

$$i_L(t_1) = \frac{v_C + V_{dc}}{L}(t_1 - t_0 - T_d)$$

This value is smaller than the value at $t=t_1$ of the operation waveform $i_L$ as illustrated in FIG. 4 (the waveform as indicated by the broken line in FIG. 10), as expressed by the following expression.

[Math 14]

$$i_L(t_1) = \frac{v_C + V_{dc}}{L}(t_1 - t_0)$$

Figure 11:
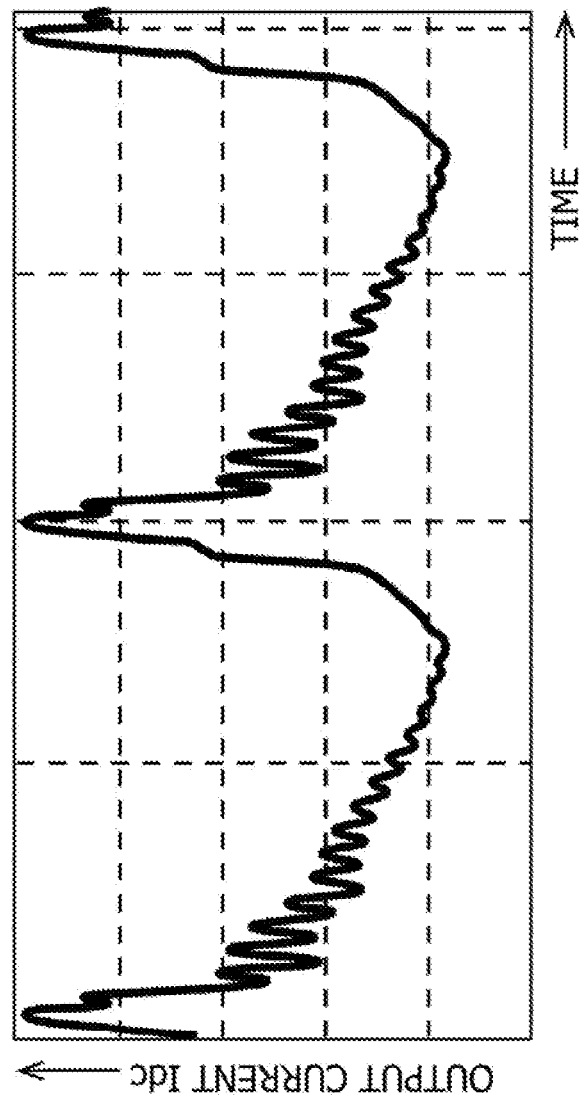

Therefore, in a case where the dead time $T_d$ is provided for all the timings at which the switches S21 to S28 of the DC/DC converter 120 are switched from OFF to ON, the waveform of the current $i_L$ of the inductor L (waveform as illustrated by a solid line in FIG. 10) has a distorted waveform and is lower in the value of the transmission power, as compared with the waveform without the dead time $T_d$ (the waveform as indicated by the broken line in FIG. 10). Furthermore, as described above, in a case where the dead time $T_d$ is provided for all the timings at which the switches S21 to S28 of the DC/DC converter 120 are switched from OFF to ON, the distortion of the output current $I_{dc}$ that is output from the third terminal 123 of the DC/DC converter 120 also increases, as illustrated in FIG. 11.

Figure 12:
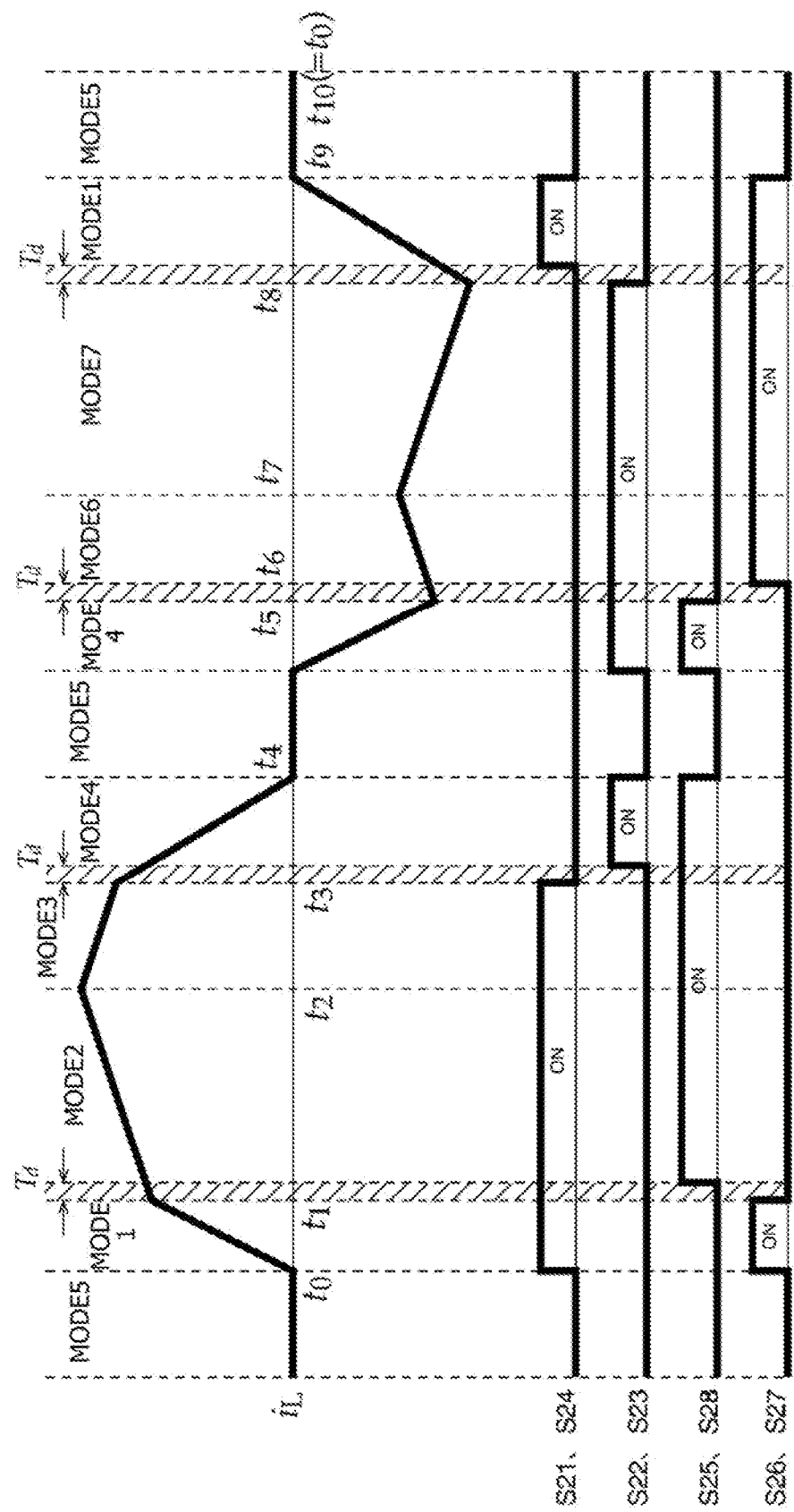
FIG. 12 is a graph for explaining settings of the dead time $T_d$ according to the present embodiment.

Therefore, in the present embodiment, as indicated by a solid line in FIG. 12, the dead time is not provided at $t=t_0$, $t_5$, and the dead time is provided only at $t=t_1, t_3, t_6,$ and $t_8$. Specifically, in the present embodiment, when the control unit 140 switches between: the first mode (mode 5) in which all of the switches S21 to S28 of the DC/DC converter 120 are in the OFF state; and any one of a plurality of second modes (i.e., mode 1 to mode 4, mode 6, mode 7) in which at least one of the switches S21 to S28 of the DC/DC converter 120 is in the ON state ($t=t_0, t_5$), the control unit 140 does not provide any dead time between these two modes (i.e., between mode 5 and mode 1 and between mode 5 and mode 4). Furthermore, in a case where any one of the switches S21 to S28 of the DC/DC converter 120 is switched from OFF to ON ($t=t_1, t_3, t_6, t_8$) when the one of two modes included in the plurality of second modes is switched to the other of the two modes included in the plurality of second modes ($t=t_1$ to $t_3$, $t_6$ to $t_8$), the control unit 140 provides a dead time between the one of the two modes and the other of the two modes (between mode 1 and mode 2; between mode 3 and mode 4; between mode 4 and mode 6, and between mode 7 and mode 1).

As a result, as illustrated in FIG. 12, the value of the current $i_L$ of the inductor L at the end of the mode 1 ($t=t_1$) becomes as follows.

[Math 15]

$$i_L(t_1) = \frac{v_C + V_{dc}}{L}(t_1 - t_0)$$

Figure 13:
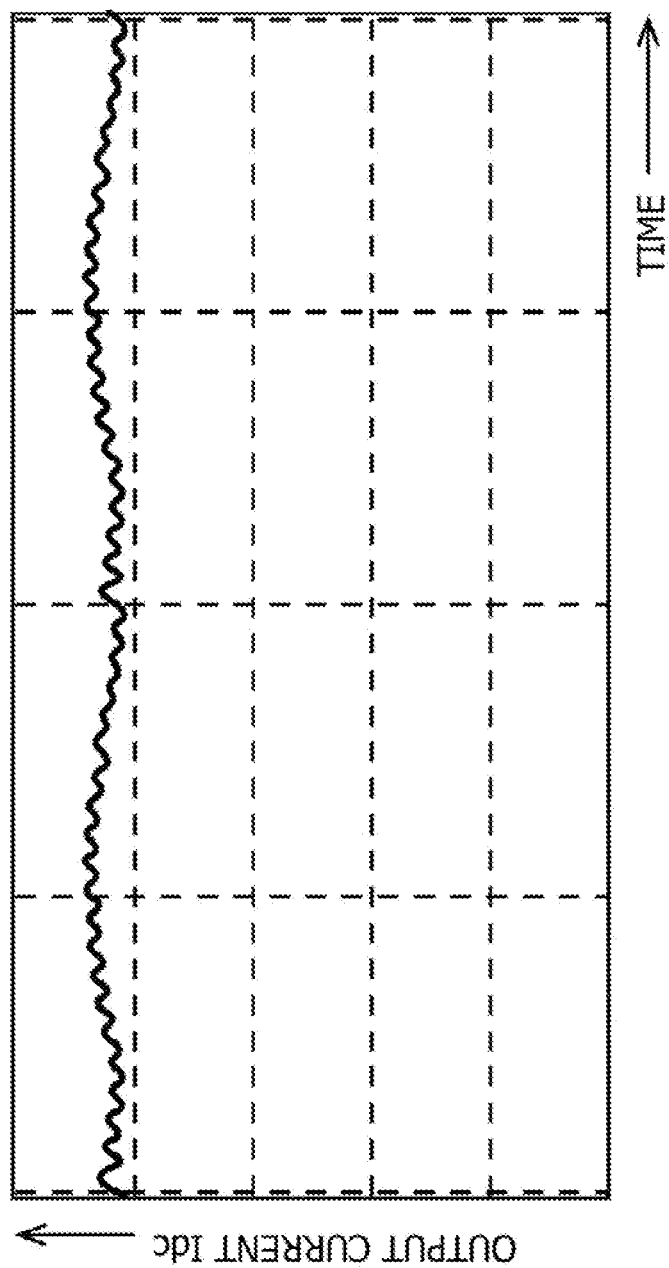
FIG. 13 is a graph for explaining the output current $I_{dc}$ according to the present embodiment.

Accordingly, the distortion of the waveform of the current $i_L$ of the inductor L is eliminated, and the decrease in the transmission power is also eliminated. Furthermore, as illustrated in FIG. 13, the distortion of the output current $I_{dc}$ is also alleviated.

As explained above, in the present embodiment, the dead time is set so that distortion does not occur in the reactor current and the output current and the transmission power does not decrease. Therefore, in the present embodiment, the compact and highly efficient charger capable of absorbing the ripple of the power can be provided.

In the above explanation, the setting of the dead time has been explained with reference to the example of the buck sequence, but the dead time can be set likewise for the boost sequence I and the boost sequence II, so that distortion does not occur in the reactor current and the output current and the transmission power does not decrease.

In a manner similar to the buck sequence (the waveform of FIG. 4), in the boost sequence I (the waveform of FIG. 6), when the control unit 140 switches between: the first mode (mode 5) in which all of the switches S21 to S28 of the DC/DC converter 120 are in the OFF state; and any one of a plurality of second modes (i.e., mode 1 to mode 4, mode 6, mode 7) in which at least one of the switches S21 to S28 of the DC/DC converter 120 is in the ON state ($t=t_0$, $t_5$), the control unit 140 does not provide any dead time between these two modes (i.e., between mode 5 and mode 1 and between mode 5 and mode 4). Furthermore, in a case where any one of the switches S21 to S28 of the DC/DC converter 120 is switched from OFF to ON ($t=t_1$, $t_3$, $t_6$, $t_8$) when the one of two modes included in the plurality of second modes is switched to the other of the two modes included in the plurality of second modes ($t=t_1$ to $t_3$, $t_6$ to $t_8$), the control unit 140 provides a dead time between the one of the two modes and the other of the two modes (between mode 1 and mode 2; between mode 3 and mode 4; between mode 4 and mode 6, and between mode 7 and mode 1).

Unlike the buck sequence (the waveform of FIG. 4), in the boost sequence II (the waveform of FIG. 8), the charger 100 is controlled according to nine modes. Therefore, in the boost sequence II (the waveform of FIG. 8), when the control unit 140 switches between: the first mode (mode 5) in which all of the switches S21 to S28 of the DC/DC converter 120 are in the OFF state; and any one of a plurality of second modes (i.e., mode 1 to mode 4, mode 6 to mode 9) in which at least one of the switches S21 to S28 of the DC/DC converter 120 is in the ON state ($t=t_0$, $t_6$), the control unit 140 does not provide any dead time between these two modes (i.e., between mode 5 and mode 1 and between mode 5 and mode 4). Furthermore, in a case where any one of the switches S21 to S28 of the DC/DC converter 120 is switched from OFF to ON ($t=t_2$, $t_4$, $t_8$, $t_{10}$) when the one of two modes included in the plurality of second modes is switched to the other of the two modes included in the plurality of second modes ($t=t_1$ to $t_4$, $t_7$ to $t_{10}$), the control unit 140 provides a dead time between the one of the two modes and the other of the two modes (between mode 8 and mode 2; between mode 3 and mode 4; between mode 9 and mode 6, and between mode 7 and mode 1).

<Generation of Control Signal>

The control unit 140 uses a triangle wave comparison method to generate a control signal for controlling switching of, for example, the switches S21 to S28 of the DC/DC converter 120 and the switch S31 of the power ripple absorption circuit 130. In the present embodiment, six modulation waves $m_1$ to $m_6$ are used. In the buck sequence, the control unit 140 sets the modulation waves $m_1$ to $m_6$ such that in the increasing period at the triangle wave, when the modulation wave $m_1$ crosses the triangle wave, the zero-current period $T_0$ ends and the reactive current period $T_q$ starts; when the modulation wave $m_2$ crosses the triangle wave, the reactive current period $T_q$ ends and the buffer capacitor discharge current period $T_C$ starts; when the modulation wave $m_3$ crosses the triangle wave, the buffer capacitor discharge current period $T_C$ ends and the power supply current period $T_{rec}$ starts; when the modulation wave $m_4$ crosses the triangle wave, the power supply current period $T_{rec}$ ends and the current balance period $T_b$ starts; when the modulation wave $m_5$ crosses the triangle wave, the current balance period $T_b$ ends and the reactive current period $T_q$ starts; and when the modulation wave $m_6$ crosses the triangle wave, the reactive current period $T_q$ ends and the zero-current period $T_0$ starts, and such that in the decreasing period at the triangle wave, when the modulation wave $m_6$ crosses the triangle wave, the zero-current period $T_0$ ends and the reactive current period $T_q$ starts; when the modulation wave $m_5$ crosses the triangle wave, the reactive current period $T_q$ ends and the power supply current period $T_{rec}$ starts; when the modulation wave $m_4$ crosses the triangle wave, the power supply current period $T_{rec}$ ends and the buffer capacitor discharge current period $T_C$ starts; when the modulation wave $m_3$ crosses the triangle wave, the buffer capacitor discharge current period $T_C$ ends and the current balance period $T_b$ starts; when the modulation wave $m_2$ crosses the triangle wave, the current balance period $T_b$ ends and the reactive current period $T_q$ starts; and when the modulation wave $m_1$ crosses the triangle wave, the reactive current period $T_q$ ends and the zero-current period $T_0$ starts.

Figure 14:
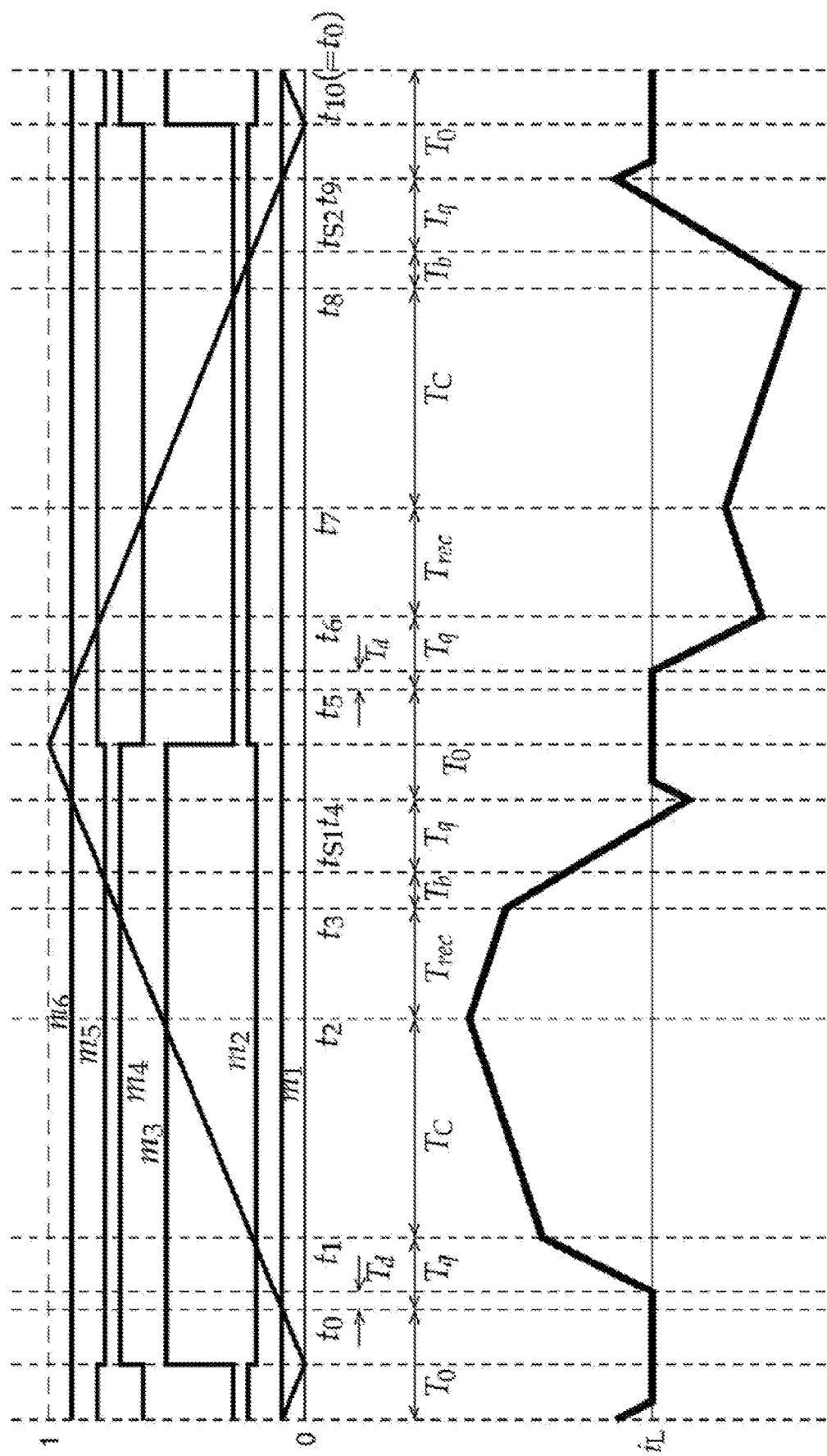

FIG. 14 is a graph for explaining the triangle wave and the modulation waves $m_1$ to $m_6$ for obtaining a waveform (the waveform indicated by the solid line in FIG. 10) with the dead time $T_d$ provided for all the timings at which the switches S21 to S28 of the DC/DC converter 120 are switched from OFF to ON. In FIG. 14, the triangle wave is set so as to attain the maximum value ($=1$) in the middle ($t=t_4+T_0/2$) of the zero-current period $T_0$ of $t_4 \leq t < t_5$, and attain the minimum value ($=0$) in the middle ($t=t_9+T_0/2$) of the zero-current period $T_0$ of $t_9 \leq t < t_{10}$. Also, in the increasing period at the triangle wave ($t_0-T_0/2 \leq t < t_4+T_0/2$), the inclination of the triangle wave is $2/T_{SW}$, the modulation waves $m_1$ to $m_6$ are set as follows.

[Math 16]

$$m_1 = \frac{2}{T_{SW}} \cdot \frac{T_0}{2} = \frac{D_0}{2}$$

$$m_2 = m_1 + D_q$$

$$m_3 = m_2 + D_C$$

$$m_4 = m_3 + D_{rec}$$

$$m_5 = m_4 + D_b$$

$$m_6 = m_5 + D_q = 1 - \frac{D_0}{2}$$

In the decreasing period at the triangle wave ($t_4+T_0/2 \leq t < t_9+T_0/2$), the inclination of the triangle wave is $-2/T_{SW}$, and accordingly, the modulation waves $m_1$ to $m_6$ are set as follows.

[Math 17]

$$m_6 = 1 - \frac{2}{T_{SW}} \cdot \frac{T_0}{2} = 1 - \frac{D_0}{2}$$

$$m_5 = m_6 - D_q$$

$$m_4 = m_5 - D_{rec}$$

$$m_3 = m_4 - D_C$$

$$m_2 = m_3 - D_b$$

$$m_1 = m_2 - D_q = \frac{D_0}{2}$$

In the waveform without the dead time at $t=t_0$, $t_5$ (the waveform of FIG. 12), the timing at which the current starts to flow through the inductor L advances by the dead time $T_d$, as compared with the solid line of FIG. 10. Accordingly, in FIG. 14, the modulation wave $m_1$ in the increasing period at the triangle wave and the modulation wave $m_6$ in the decreasing period at the triangle wave are deformed to obtain the modulation waves $m_1$ to $m_6$ for obtaining the waveform without the dead time at $t=t_0$, $t_5$ (the waveform of FIG. 12). Specifically, as indicated by the solid line in FIG. 15, in the increasing period at the triangle wave, the modulation waves $m_1$, $m_2$ are set as follows,

[Math 18]

$$m_1 = \frac{2}{T_{SW}} \cdot \left(\frac{T_0}{2} - T_d\right) = \frac{D_0}{2} - D_{td} \quad (7)$$

$$D_{td} = \frac{T_d}{T_{SW}/2}$$

$$m_2 = m_1 + D_{q1} + D_{td}$$

and in the decreasing period at the triangle wave, the modulation waves $m_6$, $m_5$ are set as follows, so that the waveform without the dead time at $t=t_0$, $t_5$ (the waveform of FIG. 12) can be obtained.

[Math 19]

$$m_6 = 1 - \frac{2}{T_{SW}} \cdot \left(\frac{T_0}{2} - T_d\right) = 1 - \frac{D_0}{2} + D_{td}$$

$$m_5 = m_6 - D_{q1} - D_{td}$$

Figure 15:
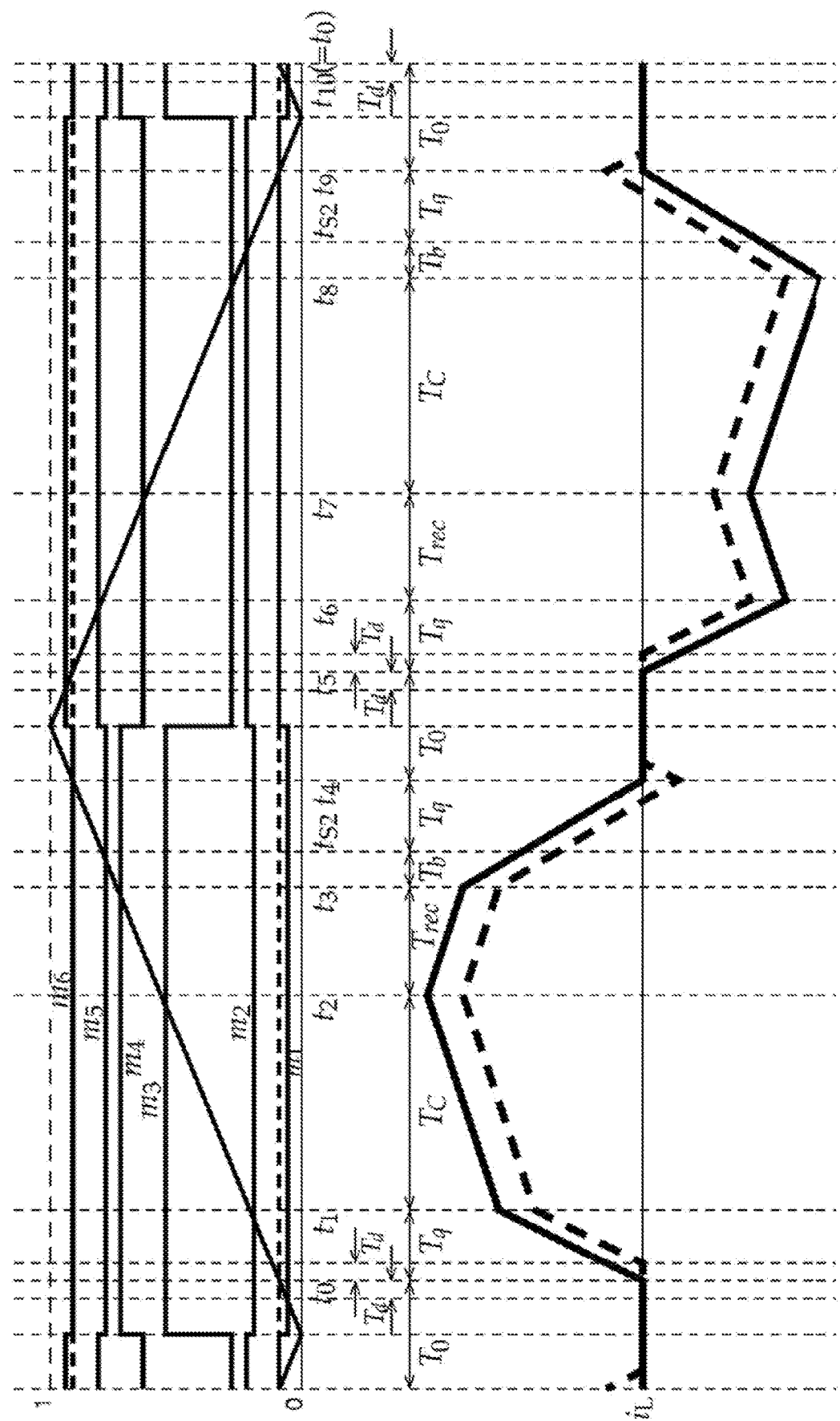
FIG. 15 is a graph for explaining deformation of the modulation waves $m_1$ to $m_6$.

However, as indicated by the solid line of FIG. 15, when the triangle wave and the modulation waves $m_1$ to $m_6$ are set, distortion remains in the output current $I_{dc}$ as illustrated in FIG. 17. Furthermore, in order for the modulation wave $m_1$ to cross the triangle wave, it is necessary to satisfy $0 \le m_1 \le 1$. Therefore, based on the above expression (7), the following expression (8) needs to be satisfied.

[Math 20]

$$D_0 \ge 2D_{td} \quad (8)$$

The value of the duty cycle D0 of the zero-current period $T_0$ can be adjusted by appropriately giving the maximum value of the voltage $v_C$ applied to the buffer capacitor Cbuf, but in order to satisfy the above expression (8), it is necessary to increase the maximum value of the voltage $v_C$ applied to the buffer capacitor Cbuf. Specifically, when the triangle wave illustrated in FIG. 14, 15 is used, it is necessary to increase the maximum value of the voltage $v_C$ applied to the buffer capacitor Cbuf.

Figure 16:
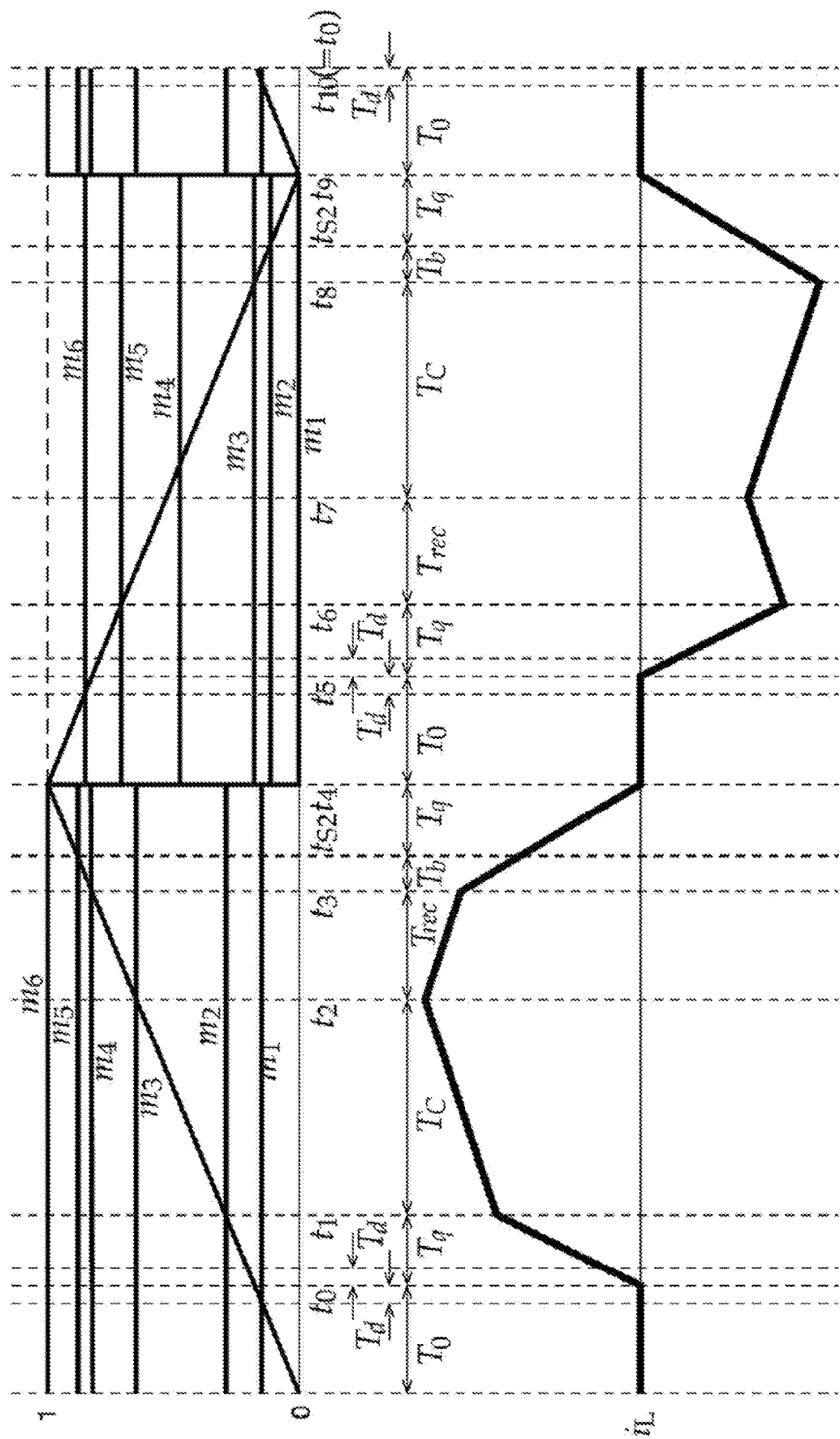
FIG. 16 is a graph for explaining the triangle wave and the modulation waves $m_1$ to $m_6$ according to the present embodiment.

Therefore, in the present embodiment, as illustrated in FIG. 16, the control unit 140 sets the triangle wave to attain the maximum value (for example, 1) or the minimum value (for example, 0) at the start of the first mode (at the start of the mode 5 ($t=t_4$, $t_9$)). FIG. 16 is a graph for explaining the triangle wave and the modulation waves $m_1$ to $m_6$ according to the present embodiment. In FIG. 16, the triangle wave is set to attain the maximum value (=1) at $t=t_4$ and attain the minimum value (=0) at $t=t_9$. In the increasing period at the triangle wave ($t_0-T_0/2 \le t < t_4+T_0/2$), the modulation waves $m_1$ to $m_6$ are set as follows.

[Math 21]

$$m_1 = \frac{2}{T_{SW}} \cdot (T_0 - T_d) = D_0 - D_{td}$$

$$m_2 = m_1 + D_q + D_{td}$$

$$m_3 = m_2 + D_C$$

$$m_4 = m_3 + D_{rec}$$

$$m_5 = m_4 + D_b$$

$$m_6 = m_5 + D_q = 1$$

In the decreasing period at the triangle wave ($t_4+T_0/2 \le t < t_9+T_0/2$), the modulation waves $m_1$ to $m_6$ are set as follows.

[Math 22]

$$m_6 = 1 - \frac{2}{T_{SW}} \cdot (T_0 - T_d)T_0 = 1 - D_0 + D_{td}$$

$$m_5 = m_6 - D_q - D_{td}$$

$$m_4 = m_5 - D_{rec}$$

$$m_3 = m_4 - D_C$$

$$m_2 = m_3 - D_b$$

$$m_1 = m_2 - D_q = 0$$

Furthermore, in order for the modulation wave $m_1$ to cross the triangle wave, it is necessary to satisfy $0 \le m_1 \le 1$. Therefore, it is necessary to satisfy the following expression (9).

[Math 23]

$$D_0 \le D_{td} \quad (9)$$

In this manner, the triangle wave is set to attain the maximum value or the minimum value at the start of the first mode (at the start of the mode 5), so that, as illustrated in FIG. 13, distortion of the output current $I_{dc}$ is also alleviated. Furthermore, in this manner, the triangle wave is set to attain the maximum value or the minimum value at the start of the first mode (at the start of the mode 5), so that the influence of the dead time $T_d$ on the modulation waves $m_1$ to $m_6$ is halved as compared with the condition of the expression (8). As a result, the maximum value of the voltage $v_C$ applied to the buffer capacitor Cbuf is not required to be increased to the condition of the expression (8).

In the above explanation, the settings of the triangle wave and the modulation wave have been explained with reference to the example of the buck sequence, but the triangle wave and the modulation wave can be set likewise for the boost sequence I and the boost sequence II, so that distortion does not occur in the output current and it is not necessary to increase the maximum value of the voltage applied to the buffer capacitor.

In a manner similar to the buck sequence (the waveform of FIG. 4), in the boost sequence I (the waveform of FIG. 6) and in the boost sequence II (the waveform of FIG. 8), the control unit 140 sets the triangle wave to attain the maximum value (for example, 1) or the minimum value (for example, 0) at the start of the first mode (at the start of the mode 5).

The position of the current balance period $T_b$ in the boost sequence I (the waveform of FIG. 6) and in the boost sequence II (the waveform of FIG. 8) is different from the position of the current balance period $T_b$ in the buck sequence (the waveform of FIG. 4). Accordingly, in the boost sequence I (the waveform of FIG. 6) and in the boost sequence II (the waveform of FIG. 8), the control unit 140 sets the modulation waves $m_1$ to $m_6$ such that in the increasing period at the triangle wave, when the modulation wave $m_1$ crosses the triangle wave, the zero-current period $T_0$ ends and the reactive current period $T_q$ starts; when the modulation wave $m_2$ crosses the triangle wave, the reactive current period $T_q$ ends and the current balance period $T_b$ starts; when the modulation wave $m_3$ crosses the triangle wave, the current balance period $T_b$ ends and the buffer capacitor discharge current period $T_c$ starts; when the modulation wave $m_4$ crosses the triangle wave, the buffer capacitor discharge current period $T_C$ ends and the power supply current period $T_{rec}$ starts; when the modulation wave $m_5$ crosses the triangle wave, the power supply current period $T_{rec}$ ends and the reactive current period $T_q$ starts; and when the modulation wave $m_6$ crosses the triangle wave, the reactive current period $T_q$ ends and the zero-current period $T_0$ starts, and such that in the decreasing period at the triangle wave, when the modulation wave $m_6$ crosses the triangle wave, the zero-current period $T_0$ ends and the reactive current period $T_q$ starts; when the modulation wave $m_5$ crosses the triangle wave, the reactive current period $T_q$ ends and the current balance period $T_b$ starts; when the modulation wave $m_4$ crosses the triangle wave, the current balance period $T_b$ ends and the power supply current period $T_{rec}$ starts; when the modulation wave $m_3$ crosses the triangle wave, the power supply current period $T_{rec}$ ends and the buffer capacitor discharge current period $T_C$ starts; when the modulation wave $m_2$ crosses the triangle wave, the buffer capacitor discharge current period $T_c$ ends and the reactive current period $T_q$ starts; and the when modulation wave $m_1$ crosses the triangle wave, the reactive current period $T_q$ ends and the zero-current period $T_0$ starts.

The present invention has been hereinabove described according to the preferred embodiment of the present invention. Although the present invention has been described with reference to the particular embodiment, various modifications and changes can be made to the embodiment without departing from the spirit and scope of the invention as set forth in the claims.

LIST OF REFERENCE SIGNS 100 charger
110 rectifier
120 DC/DC converter
S21 to S28 switches of DC/DC converter
130 power ripple absorption circuit
D31 first diode
D32 second diode
D33 third diode
Lb inductor
Cbuf buffer capacitor
S31 first switch
S32 second switch
200 alternating-current power supply
300 battery

What is claimed is:

1. A charger comprising:
a rectifier including two input terminals for connection to an alternating-current power supply, a cathode terminal, and an anode terminal;
a DC/DC converter including a first terminal connected to the cathode terminal of the rectifier via a first line, a second terminal connected to the anode terminal of the rectifier via a second line, and two output terminals for connection to a battery;
a power ripple absorption circuit including a first diode, a second diode, a third diode, an inductor, a capacitor, a first switch, and a second switch; and
a control unit configured to control switching of switches of the DC/DC converter, the first switch, and the second switch,
wherein the first diode is connected between the inductor of the power ripple absorption circuit and one of the input terminals of the rectifier,
the second diode is connected between the inductor and the other of the input terminals of the rectifier,
the capacitor and the first switch are connected in series between the first line and the second line, the capacitor being provided on a side of the second line,
the third diode is connected between: a line connecting the capacitor and the first switch;
and the inductor of the power ripple absorption circuit,
the second switch is connected between: the second line; and a line connecting the inductor of the power ripple absorption circuit and the third diode,
control of the switching of the DC/DC converter by the control unit includes a first mode in which all of the switches of the DC/DC converter are OFF and a plurality of second modes in which at least one of the switches of the DC/DC converter is ON,
when any one of the switches of the DC/DC converter is switched from OFF to ON when switching from one mode of two modes included in the plurality of second modes to the other mode of the two modes included in the plurality of second modes, the control unit provides a dead time between the one of the two modes and the other of the two modes, and
when switching from the first mode to one of the plurality of second modes, the control unit does not provide the dead time between the first mode and the one of the plurality of second modes.

2. A charger comprising:
a rectifier including two input terminals for connection to an alternating-current power supply, a cathode terminal, and an anode terminal;
a DC/DC converter including a first terminal connected to the cathode terminal of the rectifier via a first line, a second terminal connected to the anode terminal of the rectifier via a second line, and two output terminals for connection to a battery;
a power ripple absorption circuit including a first diode, a second diode, a third diode, an inductor, a capacitor, a first switch, and a second switch; and
a control unit configured to control switching of switches of the DC/DC converter, the first switch, and the second switch,
wherein the first diode is connected between the inductor of the power ripple absorption circuit and one of the input terminals of the rectifier,
the second diode is connected between the inductor and the other of the input terminals of the rectifier,
the capacitor and the first switch are connected in series between the first line and the second line, the capacitor being provided on a side of the second line,
the third diode is connected between: a line connecting the capacitor and the first switch; and the inductor of the power ripple absorption circuit, the second switch is connected between: the second line; and a line connecting the inductor of the power ripple absorption circuit and the third diode, control of the switching of the DC/DC converter by the control unit includes a first mode in which all of the switches of the DC/DC converter are OFF and a plurality of second modes in which at least one of the switches of the DC/DC converter is ON, when switching from the first mode to one of the plurality of second modes, the control unit does not provide a dead time between the first mode and the one of the plurality of second modes, the control unit generates a control signal for controlling the switches of the DC/DC converter and the first switch according to a comparison between a triangle wave and a plurality of modulation signals, points where the plurality of modulation signals cross the triangle wave correspond to transitions between the first mode and the plurality of second modes, and the control unit sets the triangle wave used in the comparison so that the triangle wave attains a maximum value or a minimum value at a start of the first mode.

3. The charger according to claim 1, wherein when a voltage that is output from the alternating-current power supply is boosted, the control unit controls the switches of the DC/DC converter, the first switch, and the second switch, so that a sum of power that is output from the alternating-current power supply and power that is output from the capacitor becomes constant.

4. The charger according to claim 3, wherein the control unit controls the switches of the DC/DC converter, the first switch, and the second switch, so that a voltage applied to the capacitor becomes larger than an output voltage of the rectifier.

5. The charger according to claim 4, wherein in a charge period that is a period in which an instantaneous power that is output from the alternating-current power supply is higher than an average power of the power that is output from the alternating-current power supply, the control unit controls the switches of the DC/DC converter, the first switch, and the second switch, so that a portion of the power that is output from the alternating-current power supply is charged to the capacitor, and in a discharge period that is a period in which the instantaneous power that is output from the alternating-current power supply is lower than the average power of the power that is output from the alternating-current power supply, the control unit controls the switches of the DC/DC converter, the first switch, and the second switch, so that the power charged in the capacitor is discharged.

6. The charger according to claim 5, wherein the control unit maintains the second switch in an OFF state in the discharge period.

7. The charger according to claim 6, wherein the control unit controls switching of the switches of the DC/DC converter and the first switch, so that an operation waveform of an inductor of the DC/DC converter becomes an operation waveform that can be approximated by a square waveform.

8. The charger according to claim 1, wherein the DC/DC converter is a Dual Active Bridge (DAB) converter.

* * * * *